(12) United States Patent
Giannini et al.

(10) Patent No.: US 10,308,072 B2
(45) Date of Patent: Jun. 4, 2019

(54) VULCANISABLE ELASTOMERIC MATERIALS FOR COMPONENTS OF TYRES COMPRISING MODIFIED SILICATE FIBRES, AND TYRES THEREOF

(71) Applicants: PIRELLI TYRE S.P.A., Milan (IT); POLITECNICO DI MILANO, Milan (IT)

(72) Inventors: Luca Giannini, Milan (IT); Luciano Tadiello, Milan (IT); Thomas Hanel, Milan (IT); Maurizio Galimberti, Milan (IT); Valeria Cipolletti, Milan (IT); Giulia Peli, Milan (IT); Franca Morazzoni, Milan (IT); Roberto Scotti, Milan (IT); Barbara Di Credico, Milan (IT)

(73) Assignees: PIRELLI TYRE S.P.A., Milan (IT); POLITECNICO DI MILANO, Milan (IT)

( * ) Notice: Subject to any disclaimer, the term of this patent is extended or adjusted under 35 U.S.C. 154(b) by 0 days.

(21) Appl. No.: 15/565,671

(22) PCT Filed: Apr. 29, 2016

(86) PCT No.: PCT/IB2016/052447
§ 371 (c)(1),
(2) Date: Oct. 10, 2017

(87) PCT Pub. No.: WO2016/174629
PCT Pub. Date: Nov. 3, 2016

(65) Prior Publication Data
US 2018/0072099 A1 Mar. 15, 2018

(30) Foreign Application Priority Data

Apr. 29, 2015 (IT) .............................. MI2015A0613

(51) Int. Cl.
| | | |
|---|---|---|
| *C08K 3/34* | (2006.01) | |
| *C08L 7/00* | (2006.01) | |
| *B60C 1/00* | (2006.01) | |
| *C08L 21/00* | (2006.01) | |
| *C08K 3/36* | (2006.01) | |
| *C08K 5/548* | (2006.01) | |
| *C08K 7/10* | (2006.01) | |
| *C08L 9/06* | (2006.01) | |
| *C08L 9/00* | (2006.01) | |

(52) U.S. Cl.
CPC .................. *B60C 1/00* (2013.01); *C08K 3/34* (2013.01); *C08K 3/36* (2013.01); *C08K 5/548* (2013.01); *C08K 7/10* (2013.01); *C08L 9/00* (2013.01); *C08L 9/06* (2013.01); *C08L 21/00* (2013.01); *C08K 2201/011* (2013.01); *Y02T 10/862* (2013.01)

(58) Field of Classification Search
CPC ....................................................... C08K 3/34
See application file for complete search history.

(56) References Cited

U.S. PATENT DOCUMENTS

| 4,152,250 A | * | 5/1979 | Inooka ..................... B01J 21/14 |
| | | | 208/213 |
| 4,569,770 A | * | 2/1986 | Martins .................. C09K 8/145 |
| | | | 507/140 |

FOREIGN PATENT DOCUMENTS

| JP | 2006131718 A | * | 5/2006 |
| WO | 2012/164433 A1 | | 12/2012 |
| WO | 2014/049516 A1 | | 4/2014 |

OTHER PUBLICATIONS

Machine translation of JP 2006-131718 A, May 25, 2006.*
Hernandez, L.G. et al., "Preparation of Silica by Acid Dissolution of Sepiolite and Study of its Reinforcing Effect in Elastomers," Die Angewandte Makromolekulare Chemie, 103, pp. 51-60 (1982). (Year: 1982).*
International Search Report and Written Opinion for PCT/IB2016/052447 filed Apr. 29, 2016 on behalf of Pirelli Tyre S.P.A. dated Aug. 11, 2016.7 pages.
Esteban-Cubillo, A. et al., "The Role of Magnesium on the Stability of Crystalline Sepiolite Structure", Journal of the European Ceramic Society, 28(9), pp. 1763-1768, (2008).
Valentin, J.L. et al., "Novel Anhydrous Unfolded Structure by Heating of Acid Pre-Treated Sepiolite", Applied Clay Science, 36(4), pp. 245-255, (2007).

* cited by examiner

*Primary Examiner* — Vickey Nerangis
(74) *Attorney, Agent, or Firm* — Steinfl + Bruno LLP

(57) ABSTRACT

A vulcanizable elastomeric composition for tire component is described. The vulcanizable elastomeric composition includes modified silicate fibers as fillers. Moreover, the tire component contains elastomeric materials which are obtainable by vulcanization of the vulcanizable elastomeric composition. A tire for vehicles which includes one or more of the tire components is also described. The vulcanized elastomeric materials are characterized by having good static and dynamic mechanical properties, and particularly low hysteresis. Advantageously, the tire which contains one or more of the tire components has a reduced rolling resistance.

24 Claims, 12 Drawing Sheets

FIG.3
B
F2a Ex. 2a (Mg -95%)
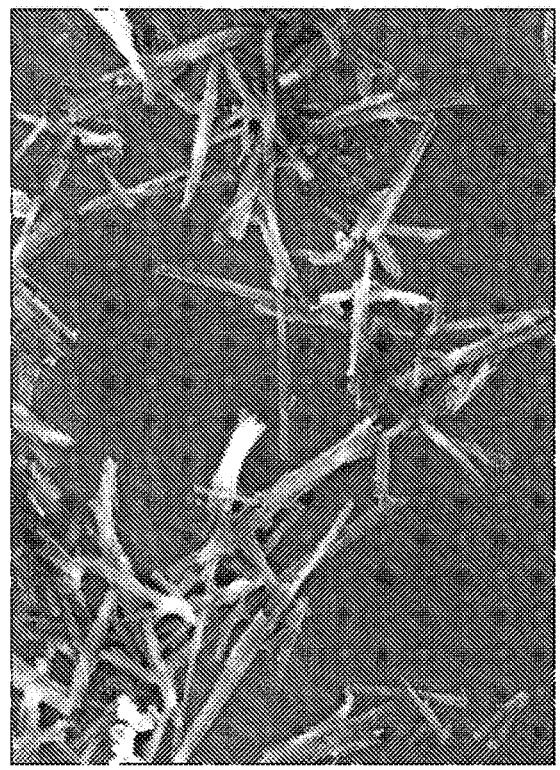
A
F1 Ex. 1 (Mg -33%)

FIG.4
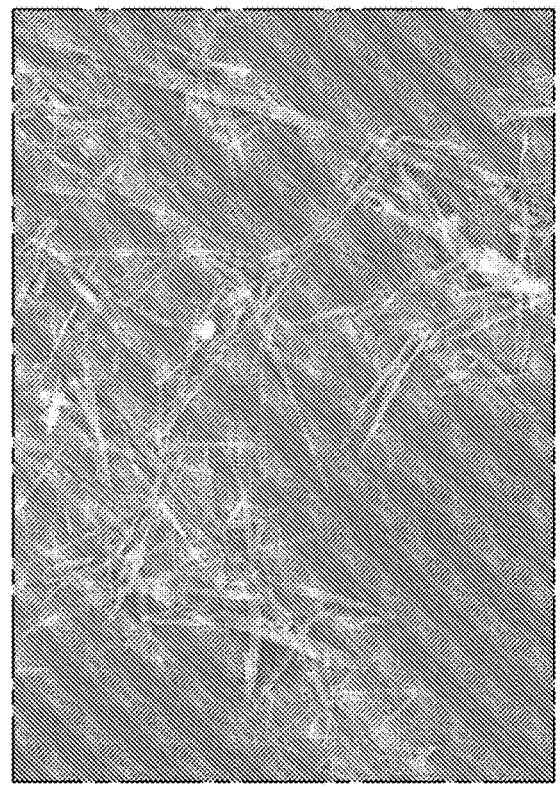
B
F6 Ex. 6 (Mg -20%)
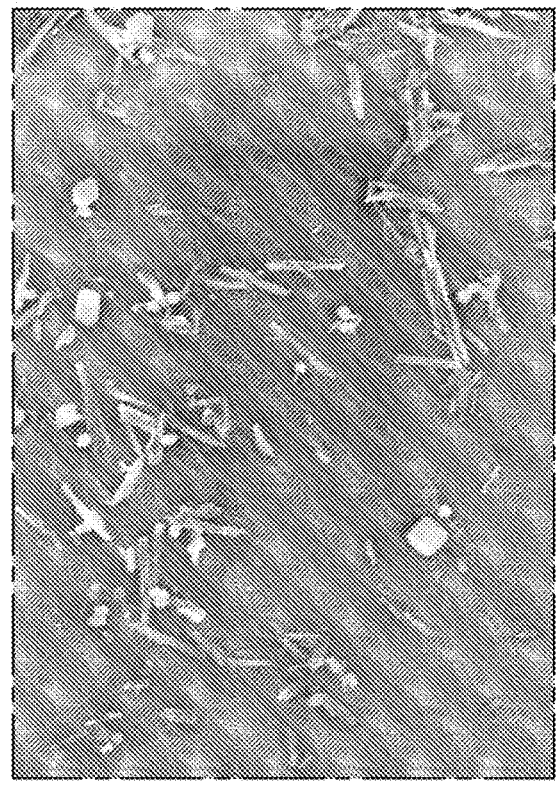
A
F3 Ex. 3 (Mg -35%)

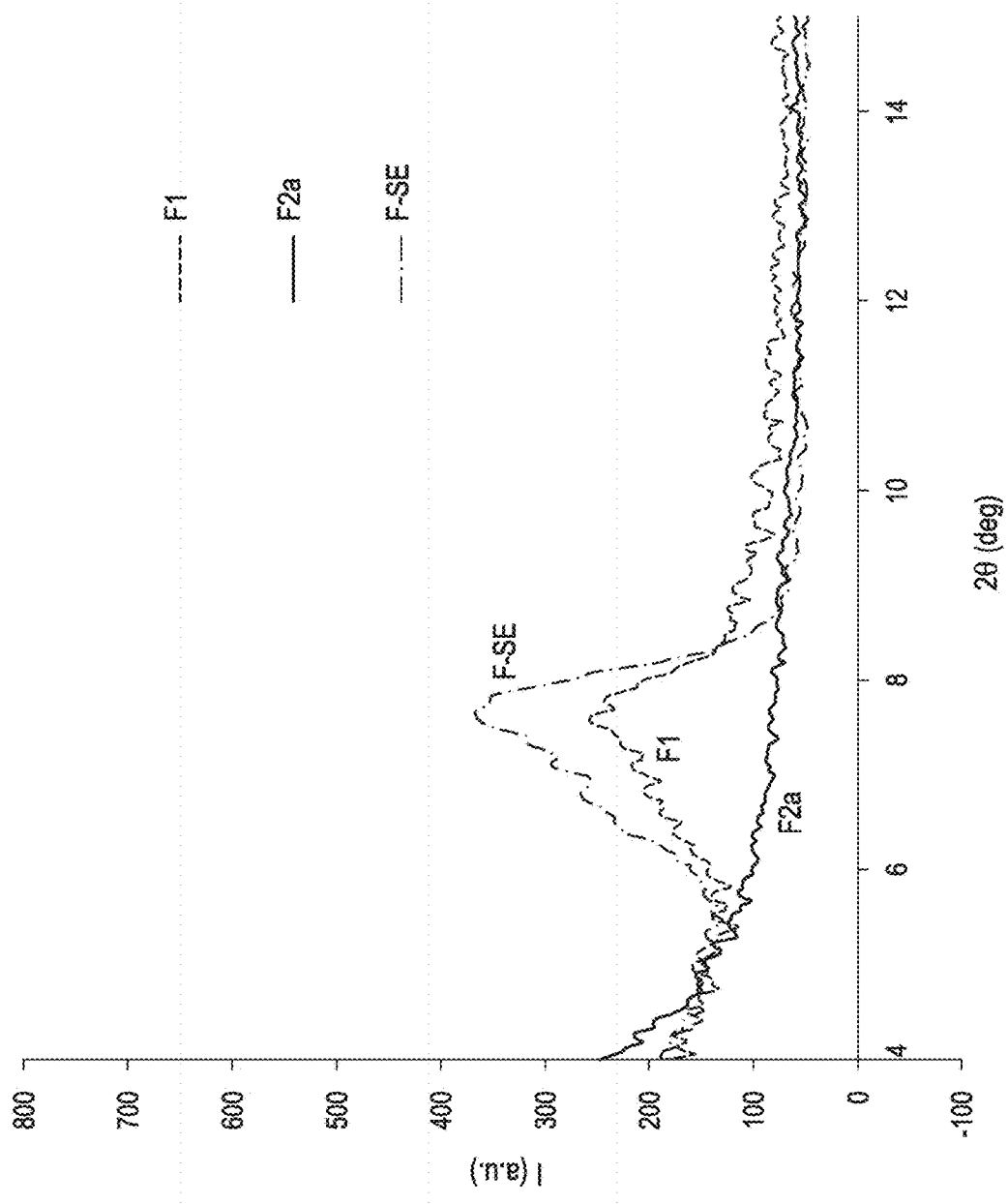

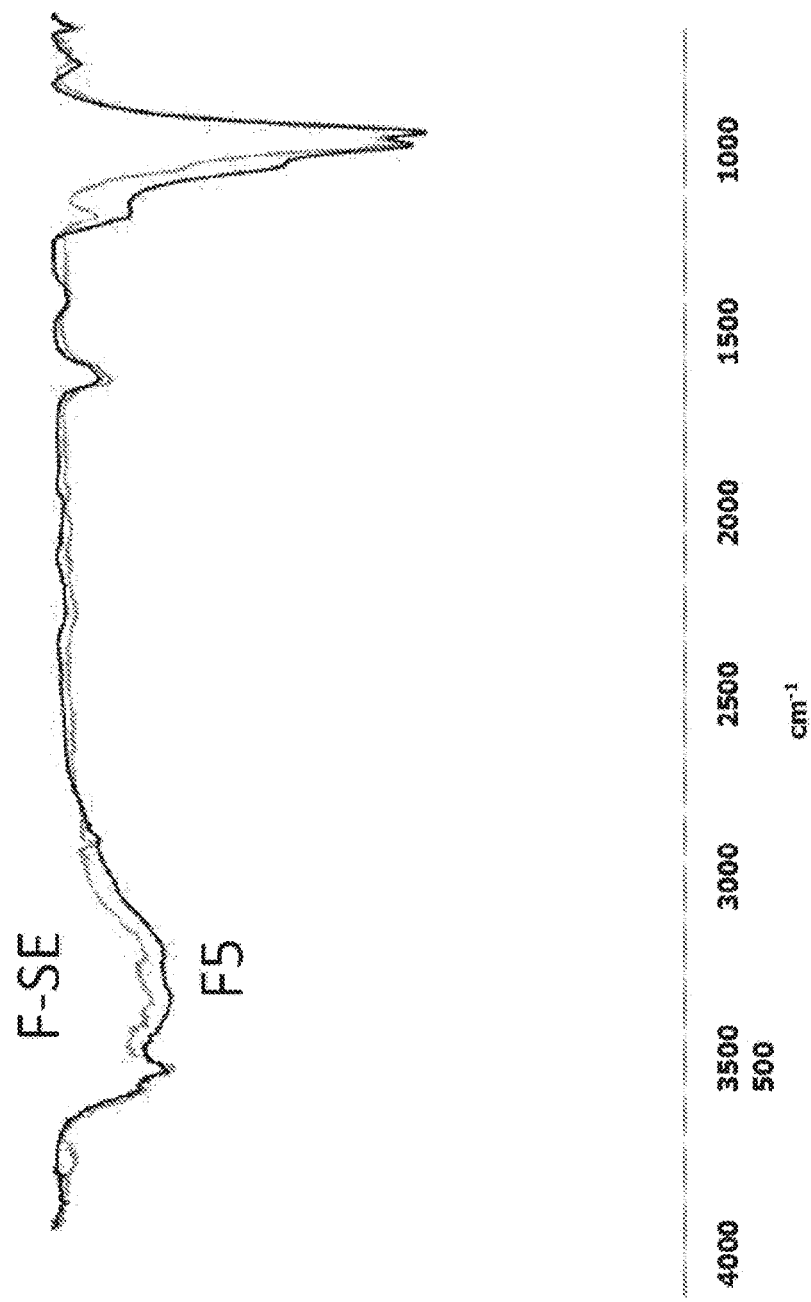

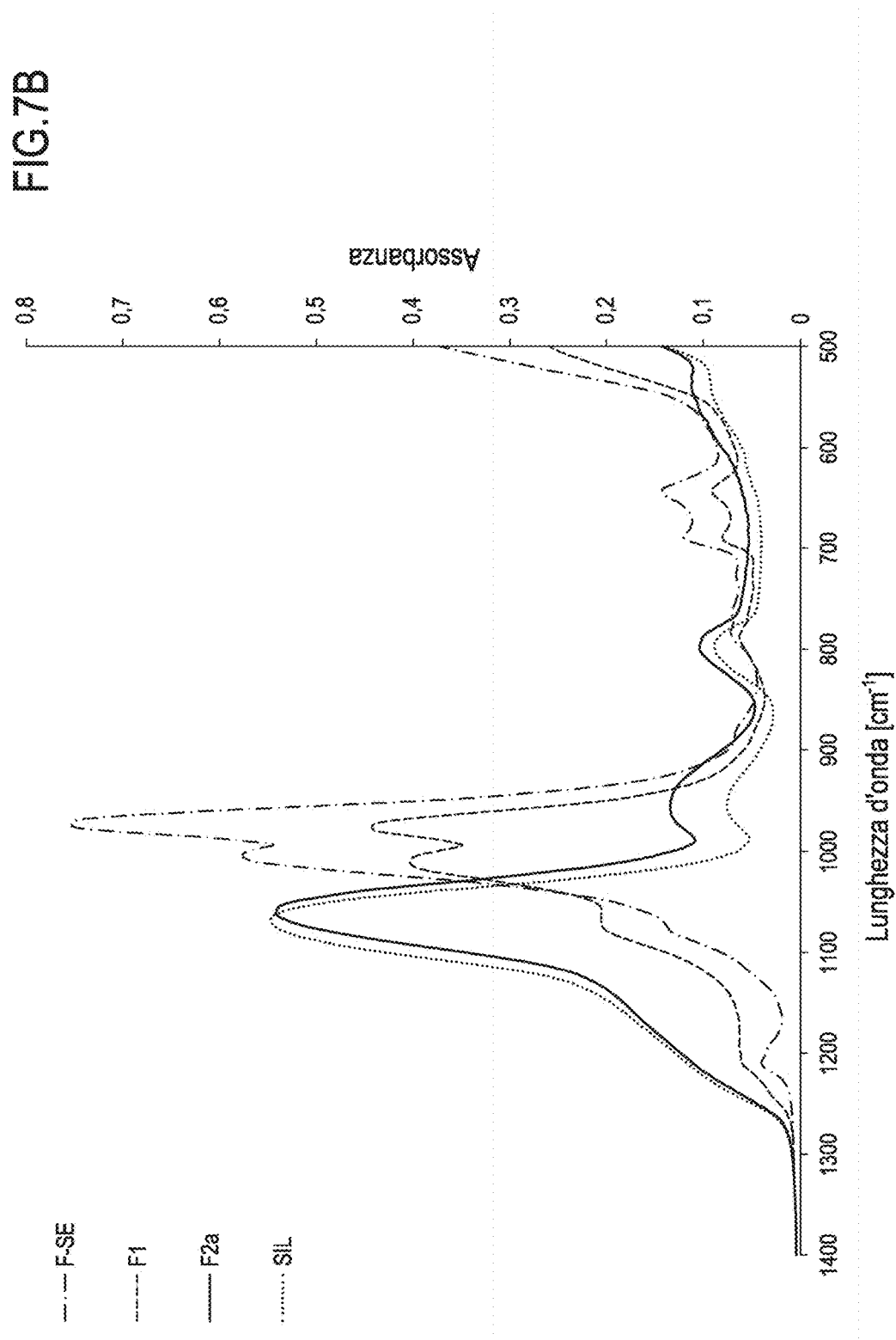

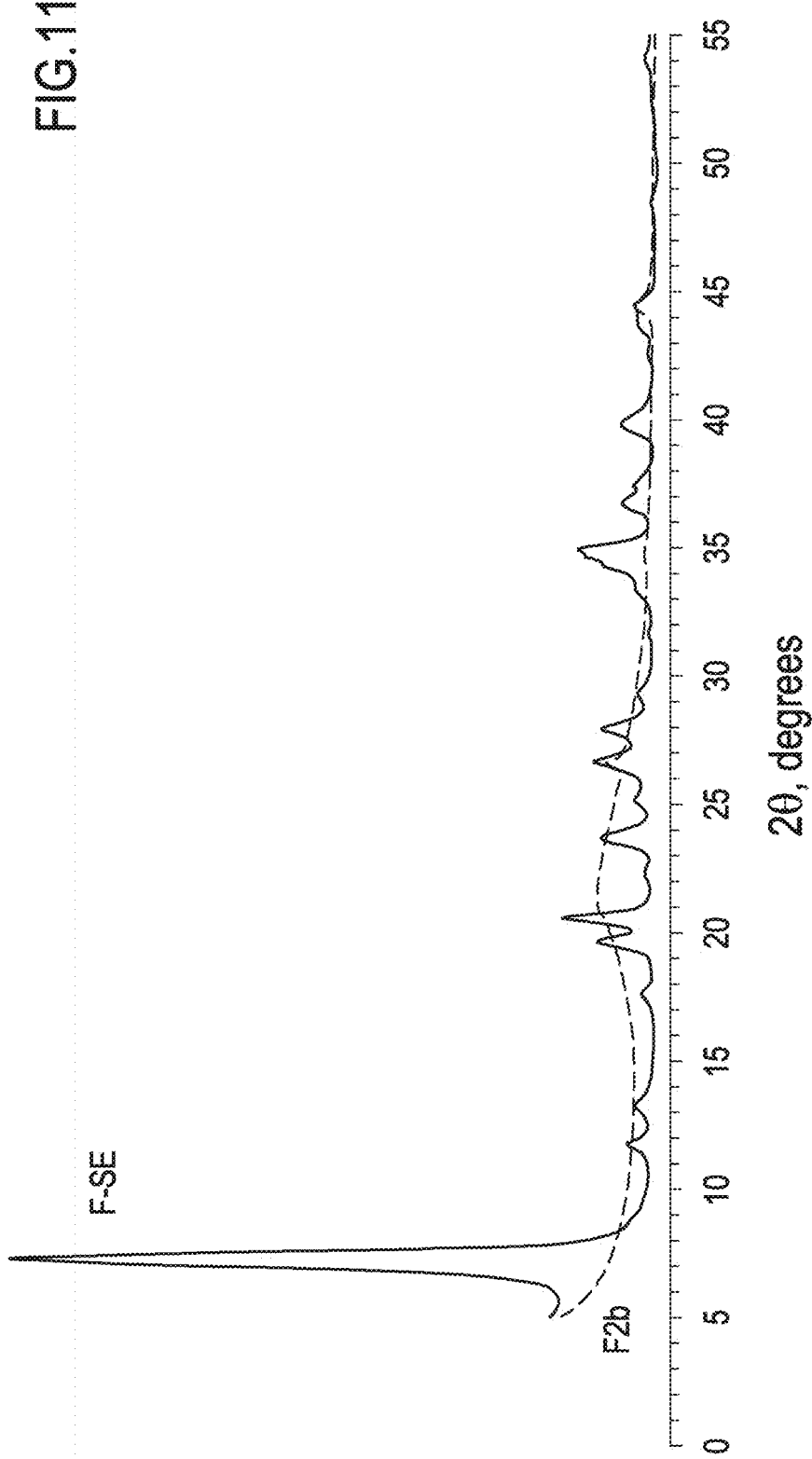

VULCANISABLE ELASTOMERIC MATERIALS FOR COMPONENTS OF TYRES COMPRISING MODIFIED SILICATE FIBRES, AND TYRES THEREOF

CROSS REFERENCE TO RELATED APPLICATIONS

The present application is the U.S. national stage of International Patent Application No. PCT/IB2016/052447 filed internationally on Apr. 29, 2016, which, in turn, claims priority to Italian Patent Application No. MI2015A000613 filed on Apr. 29, 2015.

FIELD OF THE INVENTION

The object of the present invention are new elastomeric materials for components of tyres, characterised by good static and dynamic mechanical properties, in particular by particularly low hysteresis. These elastomeric materials comprise silicate fibres of nanometric size suitably modified according to the process described herein. Moreover, the present invention relates to components of tyres and to tyres for vehicle wheels comprising said elastomeric materials, such tyres being provided with lower rolling resistance.

BACKGROUND OF THE INVENTION

In the rubber industry, and more particularly in the tyre industry, it is known to add reinforcement fillers to the elastomeric compositions in order to improve the mechanical properties and the abrasion resistance of the elastomeric materials obtained therefrom by vulcanisation.

Due to its high reinforcing power, carbon black is the most commonly used filler. However, it imparts a strong hysteresis to the articles, i.e. it increases the dissipated heat under dynamic conditions. In tyres, this results in the undesired increase of the rolling resistance, and overall in higher fuel consumption, in the production of more polluting emissions and higher transport costs.

Currently, the majority of vehicle manufacturers increasingly require their suppliers to develop low rolling resistance tyres to reduce consumption.

In order to decrease the hysteresis of elastomeric materials, it is not decisive to use small amounts of carbon black and/or a carbon black with reduced surface area, as doing so compromises the reinforcement activity, thereby worsening the static mechanical properties and the resistance abrasion of the final product.

An improvement in this sense was achieved by the use of the so-called "white" reinforcement fillers, such as chalk, talc, kaolin, bentonite, titanium dioxide and especially silica, fillers which may partially or totally replace the carbon black in elastomeric materials and impart a lower hysteresis to them while maintaining sufficient reinforcement.

However, a need remains to further reduce the rolling resistance of the tyres, and thus to identify new fillers that allow a further improvement in the balance between hysteresis and reinforcement of materials.

In fact, the hysteresis of the elastomeric material filled with silica still remains too high for certain specific applications, for example in tyres with ultra-low rolling resistance (ULRR) or in self-supporting tyres (run-flat) in which significantly lower heat dispersion and rolling resistance are instead required. The elastomeric materials filled with silica and/or silicates do not always show sufficient performance when incorporated in the components of the tyre subjected to strong stress, such as the tread, under-layer, anti-abrasive elongated element (or anti-abrasive band), sidewall, inner layers or sidewall insert, such as the sidewall insert of a self-supporting tyre.

Moreover, a problem of fillers in general, in particular silica, is represented by the fact that under dynamic conditions, i.e. when the elastomeric material filled with silica and vulcanised is stressed in the tyre in use, a partial breakdown of the dispersed filler can occur that adversely affects the mechanical properties. This phenomenon occurs with a reduction of the dynamic module that is more marked when the deformation to which the elastomeric material is subjected is higher. In practical terms, just when the tyre is most stressed and then just when the elastomeric material should show the best mechanical performance, the reinforcing effect of the filler is however lacking. This phenomenon is known as Payne effect. Fillers based on silicate fibres, while unexpectedly improving the drivability of cars subjected to high operating speeds and/or extreme driving conditions, seem to not overcome the drawbacks of silica in terms of excessive rolling resistance and less support at higher deformations.

In this regard, document WO2012164433A1 on behalf of the applicant describes tyres which have improved performance during use in extreme conditions, in particular an improved driving stability, especially at the rear side of the vehicle. At least one layer of elastomeric material is applied in these tyres, in a radially inner position with respect to the tread band, comprising fibres of nanometric size consisting of magnesium and/or aluminium silicates, in particular sepiolite. The elastomeric material, which is considerably reinforced by the sepiolite fibres, however shows a strong decrease of the dynamic shear modulus with increasing dynamic deformation (Payne effect) and a higher hysteresis compared with the material filled with silica.

Some general studies are known from the literature which describe acid treatment processes of silicate fibres, in particular of sepiolite. Depending on the more or less drastic conditions applied, such treatments can lead to the complete removal of the ions interspersed among the silicates and conversion of silicates in unstructured amorphous silica (SilSep) or to the partial removal of the ions and conversion of the silicates into silica only at a surface level, while preserving the needle-shaped morphology of the fibres.

For example, article "*Novel anhydrous unfolded structure by heating of acid pre-treated sepiolite*", Valentin, J. L., et al. Applied Clay Science, 2007, 36(4), 245-255 and article "*The role of magnesium on the stability of crystalline sepiolite structure*" Esteban-Cubillo, A. et al., Journal of the European Ceramic Society, 2008, 28(9), 1763-1768, describe the effects of the partial or total removal of magnesium on the morphology of sepiolite.

To the Applicant's knowledge, there are no hints in the prior art to advantageously use, as additional fillers in elastomeric materials for tyres, needle-shaped silicate fibres acid-modified in mild conditions and with only partial removal of magnesium. In fact, article "*Effect of the Textural Characteristics of the New Silicas on the Dynamic Properties of Styrene-Butadiene Rubber (SBR) Vulcanizates*" Polymer Composites, (June 1988), vol. 9, n. 3, 204-208 describes a study in which sepiolite fibres subjected to treatments with concentrated acid (nitric ac. 6N) to yield silica of different surface area, are incorporated in elastomeric materials and then evaluated in terms of dynamic properties. The article does not suggest the partial removal of magnesium or the preservation of the needle shape of the fibres.

In the article "*Preparation of Silica by Acid Dissolution of sepiolite and Study of its reinforcing effect in Elastomers*", Die Angewandte Makrom Chemie (1982), 103, 51-60, the authors describe the preparation of materials having a different magnesium content by treatment of sepiolite fibres with nitric acid, at variable temperatures and times. The study reports the use, in elastomeric materials for tyres, of fully extracted sepiolite described as an amorphous silica with a high surface area comprising less than 1% residual Mg, which has completely lost the crystalline order. This silica obtained by complete extraction of Mg is presented as a potential low-cost alternative to the commercial precipitated amorphous silica. The article reports only data about static mechanical properties related to mixtures filled with silica obtained by exhaustive acid treatment.

In conclusion, the relevant publications related to the tyre industry known to the Applicant teach drastic treatments of sepiolite fibres—with acid so concentrated or conditions so drastic as to completely subtract the magnesium and/or heavily modify the crystallinity and morphology of the fibres—and the subsequent incorporation of the high surface area silica thus obtained in elastomeric materials.

SUMMARY OF THE INVENTION

The Applicant has set itself the problem of how to further reduce the hysteresis of the current elastomeric materials filled with silica to make tyres with minimal rolling resistance (ULRR tyres), usable in particularly demanding conditions, or of wider applicability, such as in summer tyres for cars, for all seasons or winter, as well as in light transport tyres or tyres for heavy load vehicles.

The Applicant has also set the objective of minimizing the deterioration of mechanical properties at high deformations typical of elastomeric materials for tyres filled with silica and/or carbon black while maintaining other important performances such as reduced rolling resistance, rigidity, abrasion resistance and, in driving the vehicle, handling and comfort.

The Applicant has found that silicate fibres with of nanometric size—suitably modified according to the process described herein below—impart unexpected properties to the elastomeric material in which they are incorporated, in place of or in addition to traditional fillers. These elastomeric materials are characterised not only by high static modulus values, but also by the maintenance of the dynamic modulus at high strains and by a decreased heat generation when subjected to stress, by reduction of both the Payne effect and of the hysteresis.

The dynamic properties of the elastomeric materials comprising the present modified fibres are better than those of elastomeric materials having the same composition filled with unmodified fibres (such as those described in WO2012164433A1) or with silica alone.

The lower hysteresis of the present elastomeric materials is predictive of a reduced rolling resistance in the tyre, less than that of tyres comprising similar elastomeric materials but filled with silica.

In addition, the excellent static mechanical properties of these elastomeric materials together with the significant reduction of the Payne effect result in a high reinforcing action in the tyre that persists even under extreme stress and in extreme driving condition.

Without wishing to be bound to any particular theory, the Applicant believes that the treatment process of the silicate fibres under controlled acid conditions described herein, in its variants, would involve only a partial removal of magnesium from the fibres, with substantial preservation of the crystallinity and of the needle-shaped morphology.

The present process of partial removal of magnesium seems to generate an intermediate species between the original silicate fibre, highly structured but poorly compatible with elastomeric materials, and the completely unstructured amorphous silica with a high surface area obtainable by drastic acid treatment of the fibres (SilSep).

During the subsequent interactions with the other components of the elastomeric material, such as silanes and elastomers, and generally in the vulcanisation of the elastomeric material, this intermediate species interacts with the components. This interaction would benefit from the special needle-shaped arrangement, resulting in fact in elastomeric materials with unexpected dynamic properties, in particular considerably reduced hysteresis and Payne effect.

These effects are not observed neither in elastomeric materials comprising spheroidal and not needle-shaped precipitated amorphous silica, nor in elastomeric materials comprising the unmodified silicate fibres, in which despite the optimal needle-shaped morphology, the reactivity of amorphous silica is lacking, nor in elastomeric materials comprising silicates fibres too drastically treated with acids, with substantial loss of the crystalline structure and possibly also of the needle-shaped morphology, as shown in the prior art.

Therefore, a first aspect of the present invention is a vulcanisable elastomeric composition for components of tyres comprising at least:
(a) 100 phr of at least one diene elastomeric polymer;
(b) from 1 to 80 phr of modified silicate fibres of nanometric size, with substantially preserved needle-shaped morphology, comprising from 3.8% to 12% by weight of magnesium with respect to the weight of the fibres themselves;
(c) from 0 to 120 phr of a standard reinforcement filler;
(d) from 0.1 to 15 phr of a vulcanising agent, and
(e) from 0 to 20 phr of a coupling agent.

Said modified fibres can be obtained according to a process that comprises:
provinding silicate fibres with needle-shaped morphology of nanometric size comprising magnesium,
suspending said fibres in a liquid medium,
adding at least one acid compound to the suspension,
allowing the reaction, up to extracting from 10% to 70% by weight of magnesium from the fibres with respect to the total weight of magnesium originally contained in the fibres, substantially preserving their crystalline structure and needle-shaped morphology and
separating the fibres thus modified from the liquid medium.

A second aspect of the present invention relates to a component of a tyre for vehicle wheels comprising a vulcanised elastomeric material, obtainable by vulcanisation of said vulcanisable elastomeric composition.

A third aspect of the present invention relates to a tyre for vehicle wheels comprising at least one tyre component comprising a vulcanised elastomeric material, obtainable by vulcanisation of said vulcanisable elastomeric composition.

A fourth aspect of the present invention relates to a process for modifying silicate fibres with needle-shaped morphology of nanometric size comprising
providing silicate fibres with needle-shaped morphology of nanometric size comprising magnesium,
suspending said fibres in one or more $C_1$-$C_6$ mono- or poly-alcohols or mixtures thereof with water, adding, to the suspension, at least one acid compound in a quantity such to be in the reaction medium in a concentration not greater than 5N, allowing the reaction, up to extracting from 10% to 70% by weight of magnesium from the fibres with respect to the total weight of magnesium originally contained in the fibres, substantially preserving their crystalline structure and needle-shaped morphology and separating the fibres thus modified from the final medium.

For the purposes of the present description and of the following claims, the term "phr" (parts per hundreds of rubber) means the parts by weight of a given component of the vulcanisable elastomeric composition by 100 parts by weight of the diene elastomeric polymer.

Unless otherwise indicated, all the percentages are expressed as percentages by weight.

According to a first aspect, the present invention relates to a vulcanisable elastomeric composition for components of tyres comprising at least:

(a) 100 phr of at least one diene elastomeric polymer;
(b) from 1 to 80 phr of modified silicate fibres of nanometric size, with substantially preserved needle-shaped morphology, comprising from 3.8% to 12% by weight of magnesium with respect to the weight of the fibres themselves;
(c) from 0 to 120 phr of a standard reinforcement filler;
(d) from 0.1 to 15 phr of a vulcanising agent, and
(e) from 0 to 20 phr of a coupling agent.

The phrase "modified silicate fires of nanometric size" and similar means silicate fibres of nanometric size that have been modified by partial removal of magnesium up to a final content of the same comprised between 12% and 3.8% by weight, substantially preserving the original needle-shaped morphology and crystalline structure.

Said modified fibres can be obtained according to a process that comprises:

providing silicate fibres with needle-shaped morphology of nanometric size comprising magnesium, suspending said fibres in a liquid medium, adding at least one acid compound to the suspension, allowing the reaction, up to extracting from 10% to 70% by weight of magnesium from the fibres with respect to the total weight of magnesium originally contained in the fibres, substantially preserving their crystalline structure and needle-shaped morphology and separating the fibres thus modified from the liquid medium.

The vulcanisable elastomeric composition for components of tyres according to the present invention is characterised by one or more of the following preferred aspects taken alone or in combination with one another.

The vulcanisable elastomeric composition for components of tyres according to the present invention comprises 100 phr of at least (a) one diene elastomeric polymer. Preferably, the diene elastomeric polymer (a) which can be used in the present invention can be selected from those commonly used in sulphur-crosslinkable elastomeric materials, which are particularly suitable for producing tyres, that is to say, from elastomeric polymers or copolymers with an unsaturated chain having a glass transition temperature (Tg) generally below 20° C., preferably in the range from 0° C. to −110° C. These polymers or copolymers may be of natural origin or may be obtained by solution polymerization, emulsion polymerization or gas-phase polymerization of one or more conjugated diolefins, optionally mixed with at least one comonomer selected from monovinylarenes and/or polar comonomers in an amount not exceeding 60% by weight.

The conjugated diolefins generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof.

1,3-butadiene and isoprene are particularly preferred.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, and mixtures thereof. Styrene is particularly preferred.

Polar comonomers that may optionally be used, can be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile and mixtures thereof.

Preferably, the diene elastomeric polymer (a) which can be used in the present invention can be selected, for example, from: cis-1,4-polyisoprene (natural or synthetic, preferably natural rubber), 3,4-polyisoprene, polybutadiene (in particular polybutadiene with a high content of 1,4-cis), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

According to a preferred embodiment, said vulcanisable elastomeric composition comprises at least 10% by weight, preferably between 20% by weight and 100% by weight, with respect to the total weight of said at least one diene elastomeric polymer (a), of natural rubber.

The above vulcanisable elastomeric composition may possibly comprise at least one elastomeric polymer of one or more monoolefins with an olefinic comonomer or derivatives thereof (a'). The monoolefins can be selected from: ethylene and α-olefins generally containing from 3 to 12 carbon atoms, such as for example propylene, 1-butene, 1-pentene, 1-hexene, 1-octene and mixtures thereof. The following are preferred: copolymers selected from ethylene and a α-olefin, optionally with a diene; isobutene homopolymers or copolymers thereof with small amounts of a diene, which are optionally at least partially halogenated. The diene possibly present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene and mixtures thereof. Among them, the following are particularly preferred: ethylene/propylene (EPR) copolymers or ethylene/propylene/diene (EPDM) copolymers; polyisobutene; butyl rubber; halobutyl rubbers, in particular chlorobutyl or bromobutyl rubbers; or mixtures thereof.

A diene elastomeric polymer (a) or an elastomeric polymer (a') functionalised by reaction with suitable terminating agents or coupling agents may also be used. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, imines, carbodiimides, alkyltin halides, substituted benzophenones, alkoxysilanes or aryloxysilanes.

The present vulcanisable elastomeric composition comprises (b) modified silicates fibres with needle-shaped morphology of nanometric size.

In the present description, the term "needle-shaped morphology fibre" means an elongated element having a dimension (length) much greater than the diameter or the maximum cross-sectional dimension.

In particular, it is meant that said fibres have a ratio between the largest dimension (length) and the diameter or the maximum cross-sectional dimension (aspect ratio) of at least 2:1, preferably of at least 3:1, more preferably of at least 5:1, even more preferably at least 8:1 or 10:1.

Preferably, the fibres have an aspect ratio not greater than 1000:1, more preferably not greater than 100:1.

Preferably, said ratio is evaluated by microscopic observation, preferably performed on at least one hundred fibres.

Preferably, at least 70%, 80%, 90% of the fibres have the above aspect ratio.

The expression "nanometric size" referred to fibres means that the fibres have a diameter or maximum cross-sectional dimension of less than 500 nm.

Preferably, said fibres have a diameter or a maximum cross-sectional dimension of between 1 and 100 nm, more preferably of between 5 and 50 nm.

Preferably, said fibres have a length smaller than 10 μm, more preferably in the range between 0.1 and 10 μm, even more preferably between 0.1 and 5 μm. Preferably, said modified silicate fibres of nanometric size substantially preserve the crystalline structure.

The phrase "substantially preserving the crystalline structure" and similar means that at the end of the process described herein, the modified fibres retain most of the crystalline structure, as shown from the bands of the stronger signals of the IR spectrum (FIG. 7B) in the range of 850-1040 $cm^{-1}$ (crystalline sepiolite) with respect to those in the range of 1040-1300 $cm^{-1}$ (amorphous silica) of the IR spectrum.

In particular, in the present context the crystalline structure of fibres is deemed as substantially preserved if, after treatment, the ratio of the area under the curve of the IR spectrum in the range of 850-1040 $cm^{-1}$ to the area under the curve in the range of 1040-1300 $cm^{-1}$ is greater than 0.8, preferably greater than 1, more preferably greater than 1.25.

The phrase "substantially preserving their needle-shaped morphology" means that at the end of the process described herein, at least 50%, 60%, 80%, 70% 90% of the modified fibres retain their aspect ratio as defined above.

The silicate fibres with needle-shaped morphology that are subjected to controlled acid treatment as described herein are silicate fibres comprising magnesium, such as sepiolite fibres, paligorskite (also known as attapulgite) fibres or mixtures thereof. Examples of silicate fibres with needle-shaped morphology which can be used according to the present invention are the sepiolites marketed by Tolsa Group (http://www.tolsa.com/) under the name of Pangel S9 or Pansil 100.

In the preparation of compositions according to the present invention, the above silicate fibres are modified according to a process that comprises:

providing silicate fibres with needle-shaped morphology of nanometric size comprising magnesium,
suspending said fibres in a liquid medium,
adding at least one acid compound to the suspension,
allowing the reaction, up to extracting from 10% to 70% by weight of magnesium from the fibres with respect to the total weight of magnesium originally contained in the fibres, substantially preserving their crystalline structure and needle-shaped morphology and
separating the fibres thus modified from the final medium.

Preferably, the process for modifying silicate fibres with needle-shaped morphology of nanometric size comprises
providing silicate fibres with needle-shaped morphology of nanometric size comprising magnesium,
suspending said fibres in one or more $C_1$-$C_6$ mono- or poly-alcohols or mixtures thereof with water,
adding, to the suspension, at least one acid compound in a quantity such to be in the reaction medium in a concentration not greater than 5N,
allowing the reaction, up to extracting from 10% to 70% by weight of magnesium from the fibres with respect to the total weight of magnesium originally contained in the fibres, substantially preserving their crystalline structure and needle-shaped morphology and
separating the fibres thus modified from the final medium.

The process of preparation of the modified fibres comprises one or more of the following features, taken alone or in combination.

The process of preparation of the modified fibres firstly involves the suspension of the silicate fibres with needle-shaped morphology of nanometric size in a liquid medium.

Preferably, said liquid medium is selected from among water, alcohols, ethers, ketones and mixtures thereof, more preferably it is selected from among water, C1-C6 mono- or polyalcohols and mixtures thereof.

Preferably, said liquid medium is used in a volume/weight ratio with respect to the fibres of between 2 and 20 mL/g, preferably between 4 and 15 mL/g.

The suspension of fibres in the liquid medium can be carried out by various means, such as using a mechanical blade stirrer, a mechanical mixer, such as the type used for mixing paints and mortars, a magnetic stirrer or by sonication.

Preferably, the liquid medium is water.

Preferably, the liquid medium is a $C_1$-$C_6$ alcohol, more preferably isopropanol.

Preferably, the liquid medium is a mixture of water and at least one $C_1$-$C_6$ alcohol, more preferably water and isopropanol.

It was noted that the use of mono- or poly-alcohols, possibly mixed with water, as liquid medium advantageously allows a more controlled removal of magnesium from the fibres with respect to the same process conducted in water alone (as evidenced in examples 3 and 4—where the liquid medium is isopropanol-water and the extraction of magnesium around 35%—compared to the comparative example 2—where the solvent is water and with similar concentration of acid and time and temperature conditions, the extraction is substantially complete).

The present process then involves adding at least one acid compound to the suspension.

The acid compound is added to the suspension in such a quantity as to free hydrogen ions in solution in a number of moles at least equal to half of the magnesium moles present in the starting silicate, preferably at least equal to two-thirds, more preferable in a number of moles of between 1:1 and 10:1 with respect to the magnesium moles present in the starting silicate.

Preferably, the acid compound is added in a quantity such to be in the reaction medium in a concentration not greater than 5N, than 3.5N, than 3N, than 2N, than 1N.

Higher concentrations of acid compound may also be used, provided they are for reduced times and/or temperatures and/or in alcohol solvents or mixtures thereof, i.e. in controlled magnesium extraction conditions.

Preferably, the at least one acid compound is added in a quantity such to be in the reaction medium in a concentration of at least 0.2 N, more preferably at least 0.5 N. Preferably, the at least one acid compound is added in a quantity such to be in the final reaction medium in a concentration of between 0.6N and 3.5N, more preferably between 0.8N and 3N.

Preferably, one or more strong inorganic acids are used as acid compounds, preferably selected from hydrochloric, nitric, phosphoric, sulphuric acid or organic acids selected from acetic, formic, propionic and benzoic acid and mixtures thereof. Preferably, hydrochloric acid is used.

Optionally, a silanising agent can be added to the fibre suspension. In this case, the medium is preferably a $C_1$-$C_6$ mono- or poly-alcohol, more preferably isopropanol, or mixtures thereof with water, preferably a water-isopropanol mixture.

Preferably, the silanising agent is selected from mono- or bifunctional silanes with one or two or three hydrolysable groups such as bis-(triethoxysilylpropyl)disulphide (TESPD), bis[3-(triethoxysilyl)propyl]tetrasulphide (TESPT), 3-thio-octanoyl-1-propyltrietoxysilane (NXT), propyltrietoxysilane, more preferably it is selected from TESPD and TESPT.

Preferably, the silanising agent is added in an amount comprised between 3% and 100% by weight with respect to the weight of the fibres.

Preferably, the acidified suspension of the fibres, and optionally comprising the silanising agent, is allowed to react under stirring.

Preferably, the suspension of the fibres comprising at least one acid compound and optionally at least one silanising agent, is allowed to react at a temperature of at least 20° C., more preferably of at least 40° C., 50° C., 60° C.

Preferably, the suspension of the fibres comprising at least one acid compound and optionally at least one silanising agent, is allowed to react at a temperature not higher than 100° C., 90° C., 80° C.

Preferably, the suspension of the fibres comprising at least one acid compound and optionally at least one silanising agent, is allowed to react at a temperature of between −10° C. and the boiling temperature of the medium, more preferably between 20 and 100° C., between 20° C. and 70° C., even more preferably between 30° C. and 60° C.

Preferably, the acidified suspension of the fibres, and optionally comprising the silanising agent, is allowed to react at a pressure lower than 100 bar, more preferably at ambient pressure.

Preferably, the acidified suspension of the fibres, and optionally comprising the silanising agent, is allowed to react for at least 5 minutes.

Preferably, the reaction is continued for no more than 100 hours, preferably no more than 80 hours.

The optimum process conditions, such as the type and concentration of the acid compound, the liquid medium, the temperature and time of reaction, i.e. the conditions suitable for the extraction of from 10% to 70% by weight of magnesium from the fibres without substantial alteration of their crystalline structure and needle-shaped morphology, can be appropriately selected by the man skilled in the art following the instructions provided in the present disclosure.

In particular, it is possible to modulate the extent of the magnesium extraction by suitably modifying one or more factors such as the acid concentration and/or the type of solvent and/or the reaction time and/or temperatures.

In the specific case, in order to obtain an extraction of from 10% to 70% of magnesium from the fibres while substantially preserving the crystalline structure and the needle-shaped morphology of the same, higher concentrations of acid and/or stronger acids may be employed, for example, but for shorter times and/or lower temperatures, or vice versa.

The man skilled in the art can easily check the proper selection of the process conditions by measuring on the one hand the amount of magnesium extracted from the fibres— which will be from 10% to 70% by weight—and on the other hand by checking the substantial preservation of the crystalline structure and needle-shaped morphology of the fibres themselves through IR analysis and microscopic observation thereof, using known techniques described in the present experimental part.

The percentage by weight of extracted magnesium is calculated with respect to the total weight of the magnesium originally contained in the fibres, i.e. prior to the present treatment.

Generally, the silicates fibres, in particular natural sepiolite fibres, originally comprise from 12.5% to 15.5% of magnesium with respect to the weight of the fibres themselves.

Sepiolite fibres originally comprising about 15% of magnesium are particularly preferred.

Alternatively, the absolute residual magnesium content in the fibres may be assessed after treatment.

Preferably, the modified silicate fibres with needle-shaped morphology of nanometric size according to the process described above comprise from 3.8% to 12% by weight, preferably from 9.5% to 12% by weight of magnesium with respect to the weight of the fibres themselves.

The determination of the absolute magnesium content in the modified silicate fibres can be carried out according to known analytical methods (as a general reference, see text "TREATISE ON SOLID STATE CHEMISTRY"; Ed. Norman Bruce Hannay; 1st Ed. (1921), Vol. 1: "The Chemical Structure of Solids", chap. 2.3), such as atomic emission (AES) or atomic absorption spectroscopy, isotopic dilution, or the traditional gravimetric analyses.

Preferably, the extraction reaction is continued up to extracting at least 15%, 20%, 25%, 30% by weight of magnesium from the fibres.

Preferably, the reaction is continued up to extracting no more than 65%, 60%, 50%, 40% by weight of magnesium from the fibres.

Preferably, the reaction is continued up to extracting from 15% to 70%, preferably from 20% to 60%, even more preferably from 20% to 40%, from 20% to 35% by weight of magnesium from the fibres.

Preferably, the modified fibres with needle-shaped morphology comprise a residual amount of magnesium equal to at least 30%, 40%, 50%, 60%, 80%, 90% of the amount of magnesium initially present in the fibres.

Preferably, the modified fibres with needle-shaped morphology comprise a residual amount of magnesium equal to at least 90%, preferably at least 80% or 70% or 60% of the amount of magnesium initially present in the fibres prior to the present treatment.

Preferably, the amount of magnesium extracted from the fibres is determined according to XRF analysis as described in the experimental part.

Preferably, the modified fibres are separated by filtration, preferably followed by washing with a suitable liquid medium, preferably equal to that used in the reaction, preferably water, followed by drying in air or vacuum, optionally by heating to remove the solvent.

Preferably, the washings are conducted to obtain a substantially neutral solid, i.e. a solid that suspended in water at 1% by weight, does not cause a variation in the pH of more than two units, i.e. leads to a suspension with pH of between 5 and 9. Preferably, a base may be added to the reaction medium prior to filtration and/or to the washing medium in order to neutralise the excess acidity.

The base is not particularly limited: alkali metal and alkaline earth metal hydroxide solutions, amine hydroxides are preferred; particularly preferred are NaOH, KOH, NH$_4$OH.

The determination of the amount of magnesium extracted from the fibres, i.e. that contained in the filtrate, can be carried out by conventional analytical techniques such as complexometric methods, spectroscopic methods such as X-ray fluorescence (XRF) or atomic emission spectroscopy, preferably by X-ray fluorescence.

The Applicant has observed that by applying the process conditions described above, the silicate fibres are modified without substantially altering the crystalline structure and the needle-shaped morphology thereof. In fact, the partial extraction of magnesium substantially preserves the morphology of the fibres, as detectable by microscopic observation (for example, FIG. 2) and, also, the crystalline structure, in agreement with the XRPD and IR analyses (FIGS. 5, 6 and 7). According to the present invention, the silicate fibres with needle-shaped morphology of nanometric size modified according to the process described above are incorporated in the diene elastomeric polymer with the other components to yield the vulcanisable elastomeric composition for components of tyres.

Preferably, said modified fibres are present in the vulcanisable elastomeric composition in an amount of from 1 phr to 60 phr, preferably from 3 phr to 40 phr, preferably from 5 phr to 30 phr.

The vulcanisable elastomeric composition according to the present invention may further comprise (c) a standard reinforcement filler.

By "standard reinforcement filler" it is meant a reinforcement filler commonly used in the tyre industry, preferably selected from among carbon black, precipitated amorphous silica, amorphous silica of natural origin, such as diatomaceous earth, calcium carbonate, titanium dioxide, talc, alumina, aluminosilicates, kaolin, unmodified silicate fibres and mixtures thereof.

The phrase "unmodified silica fibres" means silica fibres not modified according to the present controlled acid extraction of magnesium.

Possibly, the silicate fibres may be otherwise modified, for example they can be treated with a compatibiliser preferably selected from quaternary ammonium salts or phosphonium salts, known in the industry, as described for example in WO2012164433A1.

Preferably, the vulcanisable elastomeric composition according to the present invention comprises (c) a standard reinforcement filler.

Preferably, the standard reinforcement filler is present, selected from among carbon black, precipitated amorphous silica, amorphous silica of natural origin, non-modified silicate fibres and mixtures thereof.

Preferably, the standard reinforcement filler (c) is present in the vulcanisable elastomeric composition in an amount generally ranging between 1 phr and 120 phr, preferably between 20 phr and 90 phr.

Preferably, the overall amount of modified fibres (b) and standard filler (c) present in the vulcanisable elastomeric composition according to the invention is at least 20 phr, more preferably at least 30 phr.

Preferably, the overall amount of modified fibres (b) and standard filler (c) present in the vulcanisable elastomeric composition according to the invention is in the range between 20 phr and 120 phr, more preferably between 30 phr and 90 phr. Preferably, the standard reinforcement filler (c) is carbon black having a surface area not smaller than 20 m$^2$/g (as determined by STSA—statistical thickness surface area according to ISO 18852:2005).

Preferably, said carbon black reinforcement filler (c) is present in the vulcanisable elastomeric composition in an amount ranging between 1 phr and 120 phr, preferably between 20 phr and 90 phr.

Preferably, the standard reinforcement filler is silica, selected from a pyrogenic silica or, preferably, a precipitated silica, with a BET surface area (measured according to the ISO 5794/1 standard) of between 50 m$^2$/g and 500 m$^2$/g, preferably between 70 m$^2$/g and 200 m$^2$/g.

The vulcanisable elastomeric composition according to the present invention comprises at least one vulcanising agent (d).

The vulcanising agent most advantageously used is sulphur, or, alternatively, sulphur-containing molecules (sulphur donors), with accelerators, activators and/or retardants known by the man skilled in the art.

Sulphur or its derivatives may advantageously be selected, for example, from: (i) soluble sulphur (crystalline sulphur); (ii) insoluble sulphur (polymeric sulphur); (iii) sulphur dispersed in oil (such as 33% sulphur, known by the trade name Crystex OT33 from Eastman); (iv) sulphur donors such as, for example, caprolactam disulphide (CLD), bis[(trialkoxysilyl)propyl]polysulphides, dithiophosphates; and mixtures thereof.

The vulcanising agent (d) is present in the vulcanisable elastomeric composition of the invention in an amount from 0.1 to 15 phr, preferably from 0.5 to 10 phr, even more preferably from 1 to 7 phr.

The vulcanisable elastomeric composition according to the present invention can optionally further comprise at least one silane coupling agent (e) able to interact with the silica possibly present as reinforcement filler and/or the silicates and to bind it to the diene elastomeric polymer during the vulcanisation.

Preferably, the vulcanisable elastomeric composition comprises at least one coupling agent.

Preferably, the silane coupling agent (e) that can be used in the present invention is selected from those having at least one hydrolysable silane group, which may be identified, for example, by the following general formula (IV):

$$(R)_3Si-C_nH_{2n}-X \qquad (I)$$

where the R groups, which may be the same or different, are selected from: alkyl, alkoxy or aryloxy groups or from halogen atoms, provided that at least one of the R groups is an alkoxy or aryloxy group or a halogen; n is an integer of between 1 and 6, inclusive; X is a group selected from:

nitrous, mercapto, amino, epoxide, vinyl, imide, chlorine, —(S)mC$_n$H$_{2n}$—Si—(R)$_3$ and —S—COR, where m and n are integers of between 1 and 6 inclusive and the R groups are as defined above.

Among the silane coupling agents, bis(3-triethoxysilyl-propyl)tetrasulphide and bis(3-triethoxysilylpropyl)disulphide are particularly preferred. Said coupling agents may be used as such or as a suitable mixture with an inert filler (such as carbon black) so as to facilitate their incorporation into the vulcanisable elastomeric composition. Preferably, said silane coupling agent (e) is present in the vulcanisable elastomeric composition in an amount ranging between 0.1 phr and 20 phr, preferably between 0.5 phr and 10 phr.

Preferably, the vulcanising agent (d) is used in combination with accelerators (f) and activators (g) known by the man skilled in the art.

The accelerators (f) that are commonly used may be selected from: dithiocarbamates, guanidine, thiourea, thiazoles, sulphonamides, thiurams, amines, xanthates and mixtures thereof.

Preferably, the vulcanisation accelerators are present in the vulcanisable elastomeric composition of the invention in amounts from 0.1 to 8 phr, preferably from 0.3 to 6 phr.

Activators (g) that are particularly effective are zinc compounds, and in particular ZnO, ZnCO$_3$, zinc salts of saturated or unsaturated fatty acids containing from 8 to 18 carbon atoms, such as, for example, zinc stearate, which are preferably formed in situ in the vulcanisable elastomeric composition from ZnO and fatty acid, as well as Bi$_2$O$_3$, PbO, Pb$_3$O$_4$, PbO$_2$, or mixtures thereof.

Preferably, the vulcanisation activators are present in the vulcanisable elastomeric composition of the invention in amounts from 0.2 to 15 phr, preferably from 0.5 to 10 phr.

Finally, the vulcanisable elastomeric materials described above may comprise other commonly used additives, selected on the basis of the specific application for which the composition is intended. For example, said materials may be admixed with: antioxidants, anti-ageing agents, plasticisers, adhesives, anti-ozone agents, modifying resins, or mixtures thereof.

In particular, in order to further improve the processability, said vulcanisable elastomeric composition may be admixed with at least one plasticiser generally selected from mineral oils, vegetable oils, synthetic oils, polymers with a low molecular weight and mixtures thereof, such as, for example, aromatic oil, naphthenic oil, phthalates, soybean oil and mixtures thereof. The amount of plasticiser generally ranges from 0 phr and 70 phr, preferably from 5 phr to 30 phr. The vulcanisable elastomeric compositions described above can be prepared by mixing together the polymeric components with the reinforcement filler and the other additives possibly present according to techniques known in the industry. The mixing can be performed, for example, using an open mixer of the "open-mill" type or an internal mixer of the type with tangential rotors (Banbury®) or with interpenetrating rotors (Intermix), or in continuous mixers of the Ko-Kneader™ type (Buss®) or of the twin-screw or multi-screw type.

A second aspect of the present invention relates to a component of a tyre for vehicle wheels comprising a vulcanised elastomeric material, obtainable by vulcanisation of the vulcanisable elastomeric composition comprising said modified fibres described above.

The vulcanisable elastomeric compositions described above can be vulcanised according to known techniques, due to the presence of sulphur-based vulcanising systems commonly used for diene elastomeric polymers. To this end, after one or more thermomechanical processing steps, a vulcanising agent, preferably sulphur-based, is incorporated in the materials, preferably together with vulcanisation accelerators. In the final treatment step, the temperature is generally kept below 120° C. and preferably below 100° C., so as to prevent any undesired pre-crosslinking phenomena. Thereafter, the vulcanisable composition is incorporated in one or more components of the tyre and subjected to vulcanisation, according to known techniques.

The tyre component according to the invention is preferably selected from among the tread, under-layer, anti-abrasive elongated element, sidewall, sidewall insert, mini-sidewall, under-liner, rubber layers, bead filler and sheet, more preferably from among the tread, under-layer and sidewall insert.

A third aspect of the present invention relates to a tyre for vehicle wheels comprising at least one tyre component according to the invention, preferably selected from the tread, under-layer, anti-abrasive elongated element, sidewall, sidewall insert, mini-sidewall, under-liner, rubber layers, bead filler and sheet, said component comprising said modified fibres.

Preferably, in the tyre according to the invention at least the tread comprises said vulcanised elastomeric material comprising modified silicate fibres according to the invention.

Preferably, in the tyre according to the invention, at least the tread and at least one component selected from under-layer, anti-abrasive elongated element, sidewall, sidewall insert, mini-sidewall, under-liner, rubber layers, bead filler and sheet comprise said vulcanised elastomeric material.

An embodiment according to the present invention relates to a tyre for vehicles, preferably a high-performance tyre (HP, SUV and UHP), comprising at least
  one carcass structure comprising at least one carcass layer having opposite lateral edges associated with respective bead structures;
  one belt structure applied in radially outer position with respect to the carcass structure,
  one tread band applied in radially outer position with respect to said belt structure, and possibly at least
one under-layer and/or one anti-abrasive elongated element and/or one sidewall and/or one sidewall insert and/or one mini-sidewall and/or one under-liner and/or one rubber layer and/or one sheet,
wherein at least one from among said carcass structure and/or tread band and/or belt structure and/or under-layer and/or anti-abrasive elongated element and/or pair of sidewalls and/or sidewall insert and/or mini-sidewall and/or under-liner and/or rubber layer and/or bead structures and/or sheet comprises said vulcanised elastomeric material described above.

Preferably, the tyre according to the invention comprises the above vulcanised elastomeric material at least in the tread or in the under-layer on in the sidewall insert.

Preferably, the tyre according to the invention comprises the above vulcanised elastomeric material in the tread and in one or more components selected from under-layer, anti-abrasive elongated element, sidewall, sidewall insert, under-liner, rubber layers, bead filler and sheet.

Preferably, the tyre according to the invention comprises the above vulcanised elastomeric material in the tread and in the under-layer.

Preferably, the tyre according to the invention comprises the above vulcanised elastomeric material in the tread and in the sidewall.

An embodiment according to the present invention is a tyre for vehicles, preferably for vehicles the driving performance of which takes advantage of an increase in the stiffness and a reduction in hysteresis and Payne effect of the elastomeric material, such as high-performance HP, UHP and SUV vehicles. The tyre according to the invention can be employed on two- or four-wheeled vehicles, or on heavy vehicles, or on light transport vehicles.

The tyre according to the invention can be for summer or winter use or for all seasons.

The tyre according to the present invention can be manufactured according to a process which comprises:
  building components of a green tyre on at least one forming drum;
  shaping, moulding and vulcanising the tyre;
wherein building at least one of the components of a green tyre comprises:
  manufacturing at least one green component comprising the vulcanisable elastomeric composition as described above.

The term green is generally used to indicate a material, a composition, a component or a tyre not yet vulcanised.

BRIEF DESCRIPTION OF THE DRAWINGS

FIG. 3 shows the FESEM (100000 magnification) microscope images of sepiolite fibres with needle-shaped morphology modified under controlled conditions according to the present process F1 (Example 1, FIG. 3A) and sepiolite fibres F2a modified by drastic acid treatment in which the needle-shaped morphology has been lost (comparative Example 2a, FIG. 3B).

FIGS. 4 (A and B) shows the microscope images (FE-SEM, 50000 magnification) of modified fibres F3 and F6 according to Examples 3 and 6, respectively (extracted magnesium: −35% and −20%).

FIG. 6 shows the XRD diffractograms in the 2 theta range from 4° to 14°, of samples of sepiolite fibres F1 modified as per Example 1, of comparative samples F2a, modified as per Example 2a, and of unmodified sepiolite fibres F-SE.

FIG. 7A shows the ATR-IR diagrams of a sample of modified sepiolite fibres F5 with needle-shaped morphology of Example 5 and a sample of original unmodified sepiolite fibres F-SE.

FIG. 7B shows a significant portion of the ATR-IR diagrams of samples of commercial silica (SIL), of unmodified sepiolite fibres (F-SE), of modified fibres of Example 1 (F1) and of the comparative Example 2a (F2a).

FIG. 11 shows the XRD diffractograms of a sample of unmodified natural sepiolite F-SE (comparative) and of a sample of sepiolite F2b (prepared in Example 2b) modified by drastic acid treatment, in which the needle-shaped morphology has been preserved but the crystalline structure has been lost.

DESCRIPTION OF EXAMPLES OF THE INVENTION

The description of some examples of the invention is given hereinafter by way of non-limiting indication.

Figure 1:
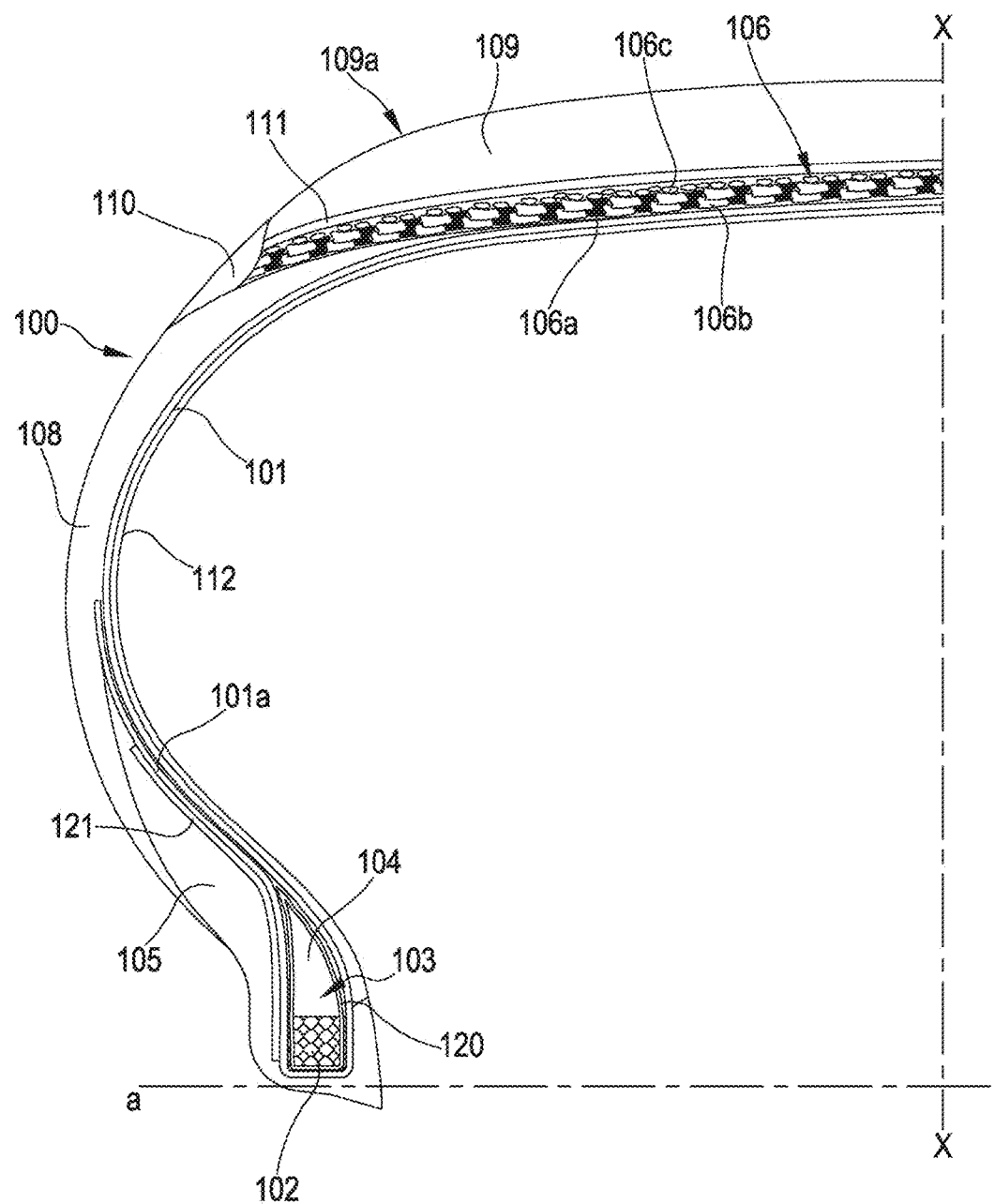
FIG. 1 shows a radial half-section of a tyre for vehicle wheels.

FIG. 1 shows a radial half-section of a tyre for vehicle wheels.

In FIG. 1, "a" indicates an axial direction and "X" indicates a radial direction, in particular X-X indicates the outline of the equatorial plane. For simplicity, FIG. 1 shows only a portion of the tyre, the remaining portion not shown being identical and arranged symmetrically with respect to the equatorial plane "X-X".

Tyre 100 for four-wheeled vehicles comprises at least one carcass structure, comprising at least one carcass layer 101 having respectively opposite end flaps engaged with respective annular anchoring structures 102, referred to as bead cores, possibly associated to a bead filler 104.

The carcass layer 101 is optionally made with an elastomeric composition.

The tyre area comprising the bead core 102 and the filler 104 forms a bead structure 103 intended for anchoring the tyre onto a corresponding mounting rim, not shown. The carcass structure is usually of radial type, i.e. the reinforcement elements of the at least one carcass layer 101 lie on planes comprising the rotational axis of the tyre and substantially perpendicular to the equatorial plane of the tyre. Said reinforcement elements generally consist of textile cords, such as rayon, nylon, polyester (for example polyethylene naphthalate, PEN). Each bead structure is associated to the carcass structure by folding back of the opposite lateral edges of the at least one carcass layer 101 around the annular anchoring structure 102 so as to form the so-called carcass flaps 101a as shown in FIG. 1, In one embodiment, the coupling between the carcass structure and the bead structure can be provided by a second carcass layer (not shown in FIG. 1) applied in an axially outer position with respect to the first carcass layer.

An anti-abrasive strip 105 optionally made with an elastomeric composition is arranged in an outer position of each bead structure 103.

The carcass structure is associated to a belt structure 106 comprising one or more belt layers 106a, 106b placed in radial superposition with respect to one another and with respect to the carcass layer, having typically textile and/or metallic reinforcement cords incorporated within a layer of vulcanised elastomeric material. Such reinforcement cords may have crossed orientation with respect to a direction of circumferential development of tyre 100. By "circumferential" direction it is meant a direction generally facing in the direction of rotation of the tyre.

At least one zero-degree reinforcement layer 106c, commonly known as a "0° belt", may be applied in a radially outermost position to the belt layers 106a, 106b, which generally incorporates a plurality of elongated reinforcement elements, typically metallic or textile cords, oriented in a substantially circumferential direction, thus forming an angle of a few degrees (such as an angle of between about 0° and 6°) with respect to a direction parallel to the equatorial plane of the tyre, and coated with vulcanised elastomeric material.

A tread band 109 of vulcanised elastomeric material is applied in a position radially outer to the belt structure 106.

Moreover, respective sidewalls 108 of vulcanised elastomeric material are applied in an axially outer position on the lateral surfaces of the carcass structure, each extending from one of the lateral edges of tread 109 at the respective bead structure 103.

In a radially outer position, the tread band 109 has a rolling surface 109a intended to come in contact with the ground. Circumferential grooves, which are connected by transverse notches (not shown in FIG. 1) so as to define a plurality of blocks of various shapes and sizes distributed over the rolling surface 109a, are generally made on this surface 109a, which for simplicity is represented smooth in FIG. 1. An under-layer 111 of vulcanised elastomeric material can be arranged between the belt structure 106 and the tread band 109.

A strip consisting of elastomeric composition 110, commonly known as "mini-sidewall", of vulcanised elastomeric material can optionally be provided in the connecting zone between sidewalls 108 and the tread band 109, this mini-sidewall generally being obtained by co-extrusion with the tread band 109 and allowing an improvement of the mechanical interaction between the tread band 109 and sidewalls 108. Preferably, the end portion of sidewall 108 directly covers the lateral edge of the tread band 109.

In the case of tubeless tyres, a rubber layer 112, generally known as "liner", which provides the necessary impermeability to the inflation air of the tyre, can also be provided in a radially inner position with respect to the carcass layer 101.

The rigidity of the tyre sidewall 108 can be improved by providing the bead structure 103 with a reinforcement layer 120 generally known as "flipper" or additional strip-like insert.

Flipper 120 is a reinforcement layer which is wound around the respective bead core 102 and the bead filler 104 so as to at least partially surround them, said reinforcement layer being arranged between the at least one carcass layer 101 and the bead structure 103. Usually, the flipper is in contact with said at least one carcass layer 101 and said bead structure 103.

Flipper 120 typically comprises a plurality of textile cords incorporated within a layer of vulcanised elastomeric material.

The bead structure 103 of the tyre may comprise a further protective layer which is generally known by the term of "chafer" 121 or protective strip and which has the function of increasing the rigidity and integrity of the bead structure 103.

Chafer 121 usually comprises a plurality of cords incorporated within a rubber layer of vulcanised elastomeric material. Such cords are generally made of textile materials (such as aramide or rayon) or metal materials (such as steel cords).

A layer or sheet of elastomeric material can be arranged between the belt structure and the carcass structure. The layer can have a uniform thickness. Alternatively, the layer may have a variable thickness in the axial direction. For example, the layer may have a greater thickness close to its axially outer edges with respect to the central (crown) zone.

Advantageously, the layer or sheet can extend on a surface substantially corresponding to the extension surface of said belt structure.

In a preferred embodiment, a layer or sheet of elastomeric material as described above can be placed between said belt structure and said tread band, said additional layer or sheet extending preferably on a surface substantially corresponding to the extension surface of said belt structure.

The elastomeric composition according to the present invention can comprise at least:
(a) 100 phr of at least one diene elastomeric polymer;
(b) from 1 to 80 phr of modified silicate fibres of nanometric size, with substantially preserved needle-shaped morphology, comprising from 3.8% to 12% by weigh of magnesium with respect to the weight of the fibres themselves;
(c) from 0 to 120 phr of a standard reinforcement filler;
(d) from 0.1 to 15 phr of a vulcanising agent, and
(e) from 0 to 20 phr of a coupling agent.

The elastomeric composition according to the present invention can comprise at least:
(a) 100 phr of at least one diene elastomeric polymer,
(b) from 1 to 80 phr of modified silicate fibres with needle-shaped morphology of nanometric size, said modified fibres being obtainable according to a process that comprises:
providing silicate fibres with needle-shaped morphology of nanometric size comprising magnesium ions,
suspending said fibres in a liquid medium,
adding at least one acid compound to the suspension,
allowing the reaction, up to extracting from 10% to 70% by weight of magnesium ions from the fibres, substantially preserving their crystalline structure and needle-shaped morphology and
separating the fibres thus modified from the liquid medium;
(c) from 0 to 120 phr of a standard reinforcement filler;
(d) from 0.1 to 15 phr of a vulcanising agent, and
(e) from 0 to 20 phr of a coupling agent.

The elastomeric composition according to the present invention can be advantageously incorporated in one or more of the components of the tyre selected from the belt structure, carcass structure, tread band, under-layer, sidewall, mini-sidewall, sidewall insert, bead, flipper, chafer, sheet and anti-abrasive strip.

According to an embodiment not shown, the tyre may be a tyre for motorcycle wheels which is typically a tyre that has a straight section featuring a high tread camber.

According to an embodiment not shown, the tyre may be a tyre for heavy transport vehicle wheels, such as trucks, buses, trailers, vans, and in general for vehicles in which the tyre is subjected to a high load.

Preferably, such a tyre is adapted to be mounted on wheel rims having a diameter equal to or greater than 17.5 inches for directional or trailer wheels.

The following examples are now provided to better illustrate the present invention.

Methods for the Analytical Characterisation of the Fibres

The original fibres, the fibres modified under drastic acid conditions (Examples 2a and 2b, comparative fibres) and the silanised and non-silanised fibres modified under controlled acid conditions (Examples 3-7), subsequently incorporated in the elastomeric materials according to the invention, were characterised with one or more of the following analytical techniques:

Determination of magnesium present in the fibres by X-ray fluorescence spectrometry (XRF spectroscopy): the Bruker AXS S4 Pioneer XRF spectrophotometer was used at room temperature. The samples were analysed by placing the powder in a sample holder having a window exposed to incident radiation with diameter of 34 mm, covered with a 4 micron polypropylene film. The measurement was conducted in helium at reduced pressure, using the standardless acquisition program "Fast-He34.mm" preset in the instrument, and processing data with the S4 tools software using as the formula $Si_6H_{14}OR_{23}$ as a calculation matrix. For greater accuracy, the determination of magnesium was carried out only on the component did not decompose when subjected in TGA to oxidative treatment up to 800° C., as better explained in Example 5.

Finally, the extraction percentage of magnesium was calculated based on the amount of magnesium present in the starting fibres, measured by the same method, as shown in Example 5.

Dosage of Mg in the Acid Reaction Medium by Complexometry

The magnesium extracted in the reaction medium can be measured by using, according to literature ("*Preparation of Silica by Acid Dissolution of sepiolite and Study of its reinforcing effect in Elastomers*", Die Angewandte Makrom Chemie (1982), 103, 51-60), a complexometric method with EDTA.

In a typical procedure, 500 μL of the filtration mother liquors are diluted with 100 mL of distilled water and treated with 4 mL of a buffer solution obtained by dissolving 5.4 g of $NH_4Cl$ in 60 mL of distilled water and 35 mL of aqueous $NH_3$ at 29% by weight. Two drops of eriochrome black T in 1% methanol solution are then added to the buffered solution. The solution is heated to 40-50° C. and is titrated with disodium EDTA 0:01 M until the solution colour changes. The total extracted magnesium is calculated from the titre of magnesium in the buffered solution taking into account the amount of supernatant removed and the total fluid volume in the reaction mixture.

The percentage of extracted Mg is then calculated based on the initial weight of reacted magnesium-containing fibres, and the initial percentage of Mg in such fibres, calculated by the molecular formula of magnesium silicate.

Field emission scanning electron microscopy FESEM: observations on the powders of the samples in Example 5 (FIG. 2) were carried out with a Vega TS5136 XM Tescan microscope in high-vacuum configuration. The excitation of the electron beam was 30 kV with a current of 25 pA. Prior to the SEM analysis, the samples were attached to a metal target with adhesive tape and subjected to sputtering with gold to improve the conductivity of electrons through the material.

In the case of Examples 1 and 2a (FIG. 3) and of Examples 3 and 6 (FIG. 4), the samples were observed with a FESEM Ultra Plus Zeiss microscope, Gemini column, in InLens mode, excitation of the electron beam from 3.0 to 5.0 KV, working distance from 2.7 to 4.3 mm.

The samples were prepared as follows: 0.005 g of fibres were dispersed in 50 mL of solution consisting of a mixture of water and ethanol in a ratio of 8:2, admixed with 200 ppm of Nonidet P40 (surfactant purchased from Sigma-Aldrich) by treatment with ultrasound in immersion for 15 minutes. The fibres were separated by centrifugation at 1000 g/m for 20 minutes and dried in stove at 100° for 3 hours.

STEM characterisation of the vulcanised elastomeric materials: the observation was conducted on thin sections (50 nm) subjected to cold ultramicrotomy (−120° C.) with a FESEM Ultra Plus Zeiss microscope, Gemini column, in InLens mode, excitation of the electron beam of 30 kV, working distance 2 mm.

X-ray diffraction (XRPD): The XRD diffraction patterns were recorded with a Bruker D8 Avance diffractometer (Cu K-alpha radiation) in the range of 2θ up to 260 with Δ (2θ)=0.02 and 4 s interval between each acquisition.

Thermogravimetric analysis (TGA): the determination of the weight loss profile was carried out with the apparatus Mettler Toledo TGA/DSC1 Star-e System and, in a temperature range of from 150 to 800° C. The measurements were carried out using a temperature program which involves a step with inert gas (ramp from 25 to 150° C. and a plateau at 150° C. in nitrogen flow) and an oxidation step (ramp from 150 to 800° C. in a flow of dry air).

Attenuated total reflectance infrared spectroscopy ATR-IR: the measurements were carried out with the instrument Perkin Elmer Spectrum 100 (1 $cm^{-1}$ resolution, range of 650-4000 $cm^{-1}$, 16 scans). This analytical technique allows easily distinguishing the original sepiolite fibres F-SE and those modified according to the present process, characterised by more intense signals in the range of 850-1040 $cm^{-1}$—in two resolved signals or even in a single band—compared to commercial silica, which shows very intense signals in the range of 1040-1300 $cm^{-1}$.

Preparation of the Fibres

Example 1

Preparation of Modified Sepiolite Fibres with Needle-Shaped Morphology F1 (Aqueous Environment, Partial Extraction of Magnesium)

Modified sepiolite fibres were prepared using the following materials:

sepiolite Pangel S9 (5 g)

3M aqueous HCl (50 mL)

Procedure

Sepiolite (5 g) is suspended in a 250 mL glass flask in 50 mL of the acid solution and is heated in an oil bath at 60° C. for 10 minutes under stirring.

The suspension is then filtered on Buchner. The solid is washed with abundant deionised water (about 1.5-2 L) until the wash water is free of chloride ions (AgNO3 test). The complexometric analysis shows the presence of 31% magnesium theoretically present in the starting silicate in the filtration mother liquors.

The recovered solid is finally dried in a stove at 70° C. for 120 hours. The XRF analysis on the modified fibres shows an extraction of magnesium equal to 33%, in agreement with the complexometric data.

As can be seen from the microscopic examination shown in FIG. 3A, the morphology of the fibres was substantially preserved. Moreover, the diffractogram in FIG. 6 and the IR spectrum in FIG. 7B confirm the substantial preservation of the crystalline structure of the sample.

In particular, in order to assess the preservation of the crystallinity, in the IR spectrum, the areas under the four curves were measured, in the ranges between 850 and 1040 $cm^{-1}$ (area of the typical signs of the crystalline structure) and between 1040 and 1300 $cm^{-1}$ (area of the typical signs of the amorphous structure) with the following results:

| Material | SIL | F2 | F1 | F-SE |
|---|---|---|---|---|
| Area 1 (850-1040 cm$^{-1}$) | 2.7 | 4.7 | 7.6 | 11.6 |
| Area 2 (1040-1300 cm$^{-1}$) | 11.7 | 11.0 | 4.6 | 2.9 |
| Area 1/Area 2 ratio | 0.23 | 0.43 | 1.65 | 4 |

As can be seen from the ratios between the areas calculated above, the sepiolite fibres of Example 1 show a substantial preservation of the crystalline structure (ratio >0.8) while the modified sepiolite fibres of Example 2 have substantially lost the crystallinity (ratio <0.8).

Example 2a (Comparative)

Preparation of Modified Sepiolite Fibres F2a (Aqueous Environment, Total Extraction of Magnesium)

This example substantially reproduces the processes described in the literature to generate amorphous silica by means of exhaustive acid treatment of the sepiolite fibres.

In particular, the procedure of Example 1 was repeated but continuing the reaction for a total of 70 minutes under the same conditions.

At the end of the process, the magnesium extraction appeared high (95% according to the XRF method) and the morphology of the fibres was no longer needle-shaped, as visible in the FE-SEM image in FIG. 3B. Moreover, the crystalline structure was substantially lost, as shown by the diffractogram shown in FIG. 6 and by the IR spectrum in FIG. 7B. The amorphous silica thus obtained was subsequently incorporated in the elastomeric material and used as a term of comparison.

As can be seen from the XRD diffractogram in FIG. 6, the peak at 6°-8°—diagnostic of the crystalline order—was completely lost in the sample of Example 2a, while it appeared largely preserved in the sample of Example 1.

Example 2b (Comparative)

Preparation of Modified Sepiolite Fibres F2b (Aqueous Environment, Total Extraction of Magnesium)

This example substantially reproduces the processes described in the literature to generate amorphous silica by means of exhaustive acid treatment of the sepiolite fibres.

In particular, the procedure described in 'Preparation of Silica by Acid Dissolution of Sepiolite and Study of its Reinforcing Effect in Elastomers' was repeated under the same conditions (60° C., HNO$_3$5N).

At the end of the process, the extraction of magnesium ions appeared high (97% according to the XRF method) but the morphology of the fibres remained substantially needle-shaped. Conversely, the crystalline structure was substantially lost, as shown by the diffractogram shown in FIG. 11. The amorphous needle-shaped silica thus obtained was subsequently incorporated in the elastomeric material and used as a term of comparison.

As can be seen from the XRD diffractogram in FIG. 11, the peak at 6°-8°—diagnostic of the crystalline order (peak F-SE) is completely lost in the sample of Example 2b.

Example 3

Preparation of Modified Sepiolite Fibres F3 (Alcohol Environment, Partial Extraction of Magnesium)

Modified sepiolite fibres were prepared using the following materials:
sepiolite Pangel S9 (120 g)
Isopropanol (1.2 L)
Aqueous HCL, 37% by weight (480 mL)
Deionised water (3 L)
Aqueous NH$_3$ 29% by weight
Procedure 120 g of sepiolite Pangel S9 were loaded into a 3 liter two-necked flask, equipped with mechanical stirrer and immersed in an oil bath at 80° C. 1.2 L of isopropyl alcohol preheated at 65° C. were added and the mixture was stirred for 15 minutes at 600 rpm. 480 mL aqueous HCl at 37% by weight were added. The mixture was kept under stirring for 120 minutes at 65° C. and then filtered on Buchner. The solid was suspended in 2 L of deionised water. An aqueous solution of NH$_3$ at 29% by weight was then added up to reaching a pH 7.0±0.2. The solid was collected on Buchner and washed with 1 L of deionised water and then dried in a stove at 120° C. for 72 hours.

The XRF analysis of a product sample showed that 35% by weight of magnesium was extracted.

At the microscopic observation (FIG. 4A), the sample preserved the morphology of sepiolite fibres. The IR analysis showed predominant signals between 850 and 1040 cm$^{-1}$ in the characteristic region of unmodified sepiolite fibres and not between 1040 and 1300 cm$^{-1}$, area of the typical signals of amorphous silica, index of the substantial preservation of the crystalline structure.

Example 4

Preparation of Modified Sepiolite Fibres F4 (Alcohol Environment, Presence of Silanising Agents, Partial Extraction of Magnesium)

Modified sepiolite fibres were prepared using the following materials:
sepiolite Pangel S9 (120 g)
bis[3-(triethoxysilyl)propyl]tetrasulphide TESPT (64.7 g)
Isopropanol (1.2 L)
Aqueous HCL, 37% by weight (480 mL)
Deionised water (3 L)
Aqueous NH$_3$ 29% by weight
Procedure 120 g of sepiolite Pangel S9 were loaded into a 3 liter two-necked flask, equipped with mechanical stirrer and immersed in an oil bath at 80° C. 1.2 L of isopropyl alcohol preheated at 65° C. were added and the mixture was stirred for 15 minutes at 600 rpm. 64.7 g TESPT and then 480 mL aqueous HCl at 37% by weight were added. The mixture was kept under stirring for 120 minutes at 65° C. and then filtered on Buchner. The solid was suspended in 2 L of deionised water. A solution of NH$_3$ at 29% by weight was then added up to reaching a pH 7.0±0.2. The solid was collected on Buchner, washed with 1 L of deionised water and dried in a stove at 120° C. for 72 hours.

The XRF analysis of a product sample showed that 35% by weight of magnesium was extracted. The complexometric analysis showed the presence of 32% magnesium theoretically present in the starting silicate in the filtration mother liquors. The result is in good agreement with the XRF data.

At the microscopic observation, the sample preserved the morphology of sepiolite fibres. The IR analysis showed predominant signals between 850 and 1040 cm$^{-1}$ in the characteristic region of unmodified sepiolite fibres, the index of the substantial preservation of the crystalline structure, and not between 1040 and 1300 cm$^{-1}$, area of the typical signals of amorphous silica.

Example 5

Preparation of Modified Sepiolite Fibres F5 (Alcohol Environment, Presence of Sulphur Silanising Agents, Partial Extraction of Magnesium)

Modified sepiolite fibres were prepared using the following materials:
sepiolite Pangel S9 (sepiolite) supplied by Tolsa
TESPT bis[3-(triethoxysilyl)propyl]tetrasulphide, isopropanol and 37% aqueous hydrochloric acid supplied by Aldrich. 29% by weight aqueous $NH_3$ was used for the final neutralisation of modified fibres, and deionised water for washing.

Procedure 120 g of sepiolite in 1200 mL isopropanol were suspended in a reaction flask at 65° C. After 10 minutes of vigorous stirring (800 rpm, mechanical stirring), 13 g of TESPT were added, followed by 96 mL of 37% aqueous hydrochloric acid.

This was left under vigorous stirring (600 rpm) at 65° C. for 72 hours.

The reaction mixture was filtered on Buchner and the solid was suspended in 2 L of deionised water. A solution of NH3 at 29% by weight was then added up to reaching a pH 7.0±0.2. The solid was collected on Buchner, washed with 1 L of deionised water and dried in a stove at 120° C. for 48 hours.

Figure 2:
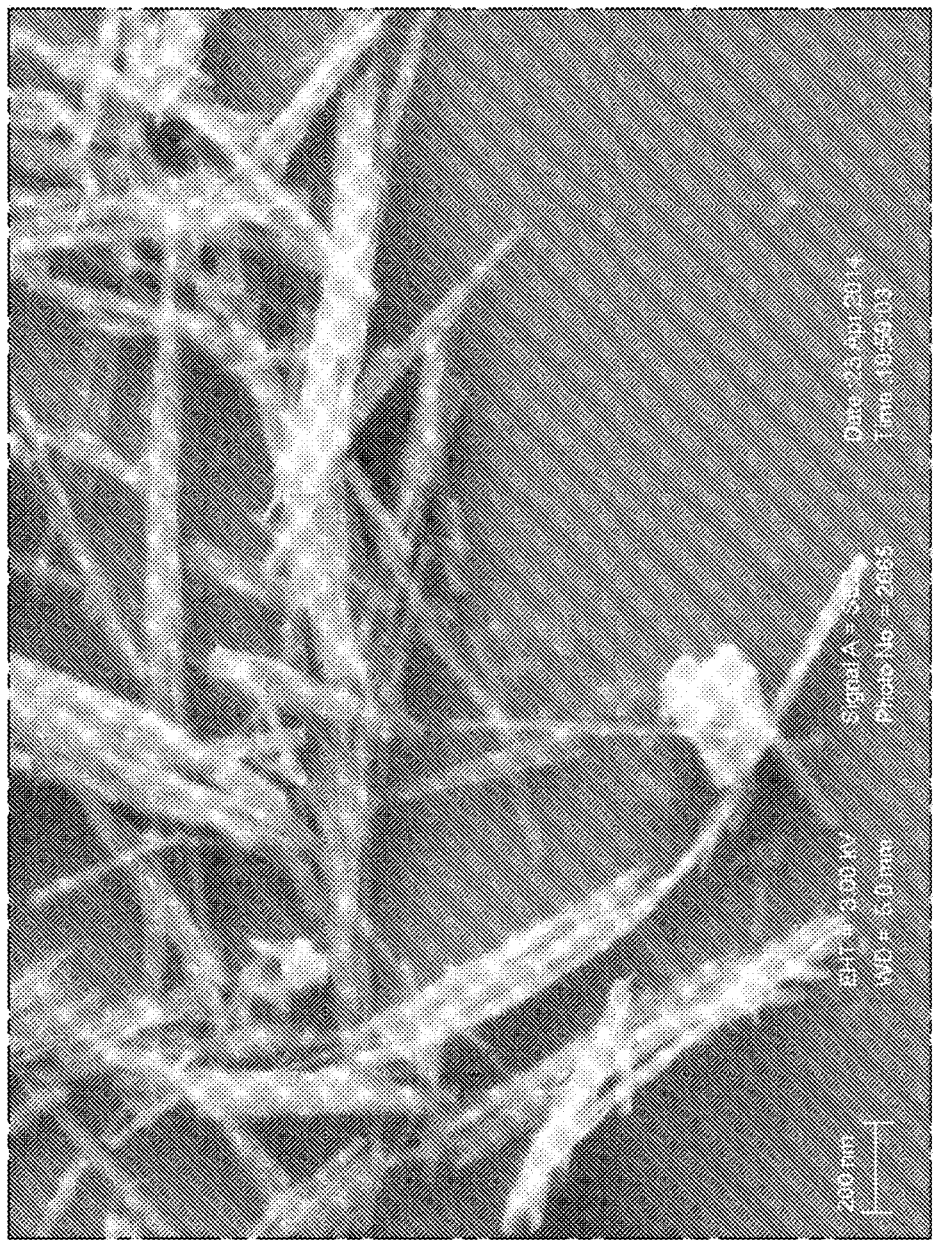
FIG. 2 shows a FESEM (Field Emission Scanning Electron Microscopy, 100000 magnification) microscope image of modified sepiolite fibres with needle-shaped morphology F5 of Example 5.

The powder thus obtained (modified fibres) was characterised and compared with original sepiolite fibres using the following techniques and with the following results:

FE-SEM Microscope Evaluation (FIG. 2):

FIG. 2 shows the needle-shaped modified sepiolite fibres of nanometric size of Example 5. These fibres have an average diameter of 20±5 nm and a length of 460±400 nm, with an aspect ratio of approximately 23±10.

Figure 5:
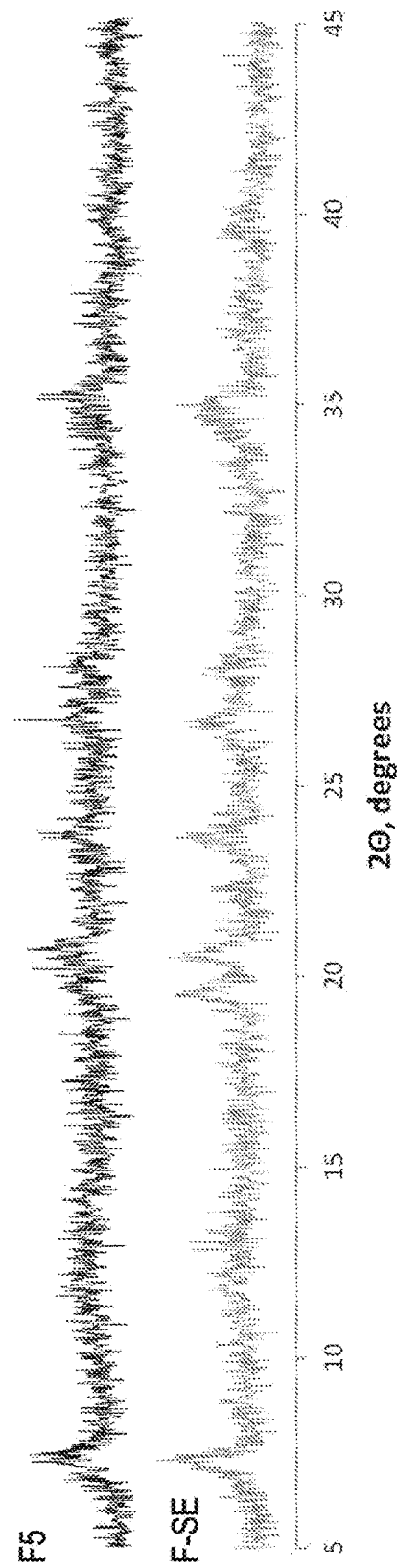
FIG. 5 shows the XRD diffractograms of a sample of unmodified natural sepiolite F-SE (comparative) and of a sample of sepiolite F5 modified by mild acid treatment as per Example 5.

XRD Analysis (FIG. 5)

The XRD analysis on modified sepiolite according to Example 5 (F5) and on original unmodified sepiolite (F) shows that treatment under controlled acid conditions did not substantially change the crystalline structure of sepiolite. In fact, the typical diffractogram of original sepiolite (Pangel S9) is closely comparable with that of the modified sepiolite sample, in particular the peak at 2 theta 7.5° characteristic of sepiolite is recognisable.

Thermogravimetric Analysis TGA

The loss in weight during TGA (from 150 to 800° C.) was calculated to be equal to 6.5% by weight for the original unmodified sepiolite sample (F-SE) and 17.6% by weight for the sample in Example 5 silanised and treated under acid conditions (F5).

ATR-IR Spectroscopic Analysis (FIGS. 7A and 7B)

The samples of original unmodified sepiolite F-SE and of sepiolite F5 modified under controlled conditions of Example 5 were subjected to IR analysis to evaluate the controlled acid-induced treatment chemical changes.

As can be seen in FIG. 7A, the two diagrams are in general very similar: both show the signals due to stretching of the bonds of the OH groups linked to magnesium (3500-3700 cm$^{-1}$) and to silicon (3300-3500 cm$^{-1}$) and the double peak of the Si—O bond stretching (SiOSi and SiOMg stretching) at about 1000 cm$^{-1}$ typical of magnesium silicates such as sepiolite and sepiolite fibres as modified according to the present process.

FIG. 7B instead shows a detail of the IR spectra of commercial silica (SIL), of the unmodified sepiolite (F-SE), of the sepiolite modified with partial extraction of magnesium of Example 1 (F1) and with full extraction of Example 2a (F2a).

As can be seen, the sample of Example 1, like that of the unmodified sepiolite, shows a strong absorption at between 850 and 1040 cm$^{-1}$ while the commercial silica and sample F2a, from which about 95% of Mg was extracted, generate more intense peaks at between 1040 and 1300 cm$^{-1}$.

Determination of Magnesium by Complexometry

The amount of magnesium extracted from the fibres was carried out by complexometric titration on the filtration mother liquors: 500 μL of the filtration mother liquors were diluted with 100 mL of distilled water and treated with 4 mL of a buffer solution obtained by dissolving 5.4 g of $NH_4Cl$ in 60 mL of distilled water and 35 mL of a solution of aqueous $NH_3$ at 29% by weight.

Two drops of eriochrome black T in 1% methanol solution were added to the buffered solution. After heating the solution to 40-50° C., it was titrated with disodium EDTA 0:01 M until the solution colour changes. The total extracted magnesium is calculated from the titre of magnesium in the buffered solution taking into account the amount of supernatant removed (500 μL) and the total fluid volume in the reaction mixture (1296 μL).

The percentage of extracted Mg was then calculated based on the initial amount of reacted magnesium-containing fibres (120 g), and the initial percentage of Mg in such fibres, calculated by the molecular formula of magnesium silicate $Mg_4Si_6O_{15}(OH)_2(H_2O)_6$, i.e. a 15% percentage of the starting weight of magnesium. The percentage of extracted Mg was equal to 25% of the initially present Mg.

Determination of Magnesium by XRF Spectroscopy

The amount of magnesium in the fibres before (sample F-SE, Sepiolite as is) and after controlled acid treatment (sample F5, sample treated as described above) was determined by XRF analysis.

The results of these analyses are presented in the following Table 1

TABLE 1

| | Mg % measured | Mg % recalculated on residual TGA | Mg % extracted |
|---|---|---|---|
| sepiolite F-SE | 13.1 | 14.0 | — |
| modified sepiolite F5 | 8.6 | 10.4 | 26 |

For greater accuracy, the amount of magnesium was calculated on the samples after TGA, i.e. on the dry inorganic component of the same alone—equal to 93.5% for the sepiolite F-SE sample and to 82.4% for the modified sepiolite F5, respectively—which did not decompose by oxidative treatment at 800° C. As can be seen from the data in the table, the residual magnesium quantity in the sample subjected to controlled acid treatment according to the present process (F5) is lower (10.4%) and equal to about 74% of the initial quantity. Therefore, the acid treatment removed 26% of magnesium from the sepiolite fibres, preserving the original structure of the silicate, as demonstrated by the XRD spectrum in FIG. 5 and by the IR spectrum in FIG. 7A. The magnesium extraction data calculated according to this methodology on powders is in very good agreement with the complexometric data obtained on the filtration mother liquors.

Example 6

Preparation of Modified Sepiolite Fibres F6 (Aqueous Environment, Partial Extraction of Magnesium)

Modified sepiolite fibres were prepared using the following materials:
sepiolite Pangel S9 (120 g)
1M aqueous HCl (1.45 L)
Deionised water (2 L)
Aqueous $NH_3$ 29% by weight Procedure 120 g of sepiolite Pangel S9 were loaded into a 3 liter two-necked flask equipped with a mechanical stirrer. 1.45 L of HCl 1M were added and the mixture was stirred for 60 minutes at 600 rpm at 23° C. and then filtered on Buchner. The solid was suspended in 2 L of deionised water. A solution of $NH_3$ at 29% by weight was then added up to reaching a pH 7.0±0.2. The solid was collected on Buchner and washed with 1 L of deionised water and then dried in a stove at 120° C. for 72 hours.

The XRF analysis of a product sample showed that 20% by weight of magnesium was extracted.

At the microscopic observation (FIG. 4B), the sample preserved the morphology of sepiolite fibres.

The IR analysis in the 850-1300 $cm^{-1}$ region showed signals between 850 and 1040 $cm^{-1}$ that were predominant over those between 1040 and 1300 $cm^{-1}$ indicating the substantial preservation of the crystalline structure.

Example 7

Preparation of Modified Sepiolite Fibres F7 (Alcohol Environment, Presence of Non-Sulphur Silanising Agents, Partial Extraction of Magnesium)

Modified sepiolite fibres were prepared using the following materials:
sepiolite Pangel S9 (sepiolite) supplied by Tolsa
$Me_2Si(EtO)_2$ dimethyldiethoxysilane,
isopropanol,
37% aqueous hydrochloric acid
29% by weight $NH_3$ was used for the final neutralisation of modified fibres, and deionised water for washing.

Procedure 120 g of sepiolite in 1200 mL isopropanol were suspended in a reaction flask at 65° C. After 10 minutes of vigorous stirring (800 rpm, mechanical stirring), 35.6 g of $Me_2Si(EtO)_2$ were added, followed by 480 mL of 37% aqueous hydrochloric acid. The mixture was kept under stirring for 120 minutes at 65° C. and then filtered on Buchner. The solid was suspended in 2 L of deionised water. A solution of $NH_3$ at 29% by weight was then added up to reaching a pH 7.0±0.2. The solid was collected on Buchner, washed with 1 L of deionised water and dried in a stove at 120° C. for 72 hours.

The XRF analysis of a product sample showed that 28% by weight of magnesium was extracted.

At the microscopic observation, the sample preserved the morphology of sepiolite fibres. The IR analysis in the 850-1300 $cm^{-1}$ region showed signals between 850 and 1040 $cm^{-1}$ that were predominant over those between 1040 and 1300 $cm^{-1}$ indicating the substantial preservation of the crystalline structure.

The following summary Table 2 shows examples of preparation of the fibres, the quantity of magnesium extracted, the elastomeric materials in which the fibres were incorporated, with reference to the corresponding examples (green and vulcanised materials):

TABLE 2

|  | Fillers/fibres |  | % extracted Mg | Elastomeric material | Preparation of the green material | Preparation of the vulcanised material |
|---|---|---|---|---|---|---|
| Ref. | silica | SIL | — | Standard 1 | Ex. 8 MA | Ex. 12 V-MA |
| Ref. | silica | SIL | — | Internal appl. | Ex. 9 ME | Ex. 13 V-ME |
| Ref. | silica | SIL | — | Tread | Ex. 10 ML | Ex. 14 V-ML |
| Ref. | sepiolite | F-SE | — | Standard 1 | Ex. 8 MB | Ex. 12 V-MB |
| Ref. | sepiolite | F-SE | — | Internal appl. | Ex. 9 MF | Ex. 13 V-MF |
| Ref. | sepiolite | F-SE | — | Tread | Ex. 10 MM | Ex. 14 V-MM |
| Ref. | sepiolite | F-SE | — | Standard 2 | Ex. 11 MO | Ex. 15 V-MO |
| Inv. | Ex. 1 | F1 | 33% | Standard 1 | Ex. 8 MD | Ex. 12 V-MD |
| Ref. | Ex. 2a | F2a | 95% | Standard 1 | Ex. 8 MC1 | Ex. 12 V-MC1 |
| Ref. | Ex. 2b | F2b | 97% | Standard 1 | Ex. 9 MC2 | Ex. 13 V-MC2 |
| Inv. | Ex. 3 | F3 | 35% | Internal appl. | Ex. 9 MG | Ex. 13 V-MG |
| Inv. | Ex. 4 | F4 | 35% | Internal appl. | Ex. 9 MH | Ex. 13 V-MH |
| Inv. | Ex. 4 | F4 | 35% | Tread | Ex. 10 MN | Ex. 14 V-MN |
| Inv. | Ex. 5 | F5 | 26% | Internal appl. | Ex. 9 MI | Ex. 13 V-MI |
| Inv. | Ex. 5 | F5 | 26% | Standard 2 | Ex. 11 MP | Ex. 15 V-MP |
| Inv. | Ex. 6 | F6 | 20% | Internal appl. | Ex. 9 MJ | Ex. 13 V-MJ |
| Inv. | Ex. 7 | F7 | 28% | Internal appl. | Ex. 9 MK | Ex. 13 V-MK |

Preparation of the Elastomeric Materials (M)

The vulcanisable elastomeric materials of the following examples were prepared as described herein. The quantities of the various components are shown in phr.

All the components, except for sulphur and the vulcanisation accelerator (TBBS), were mixed in an internal mixer (Brabender) for about 5 minutes (1st step). As soon as the temperature reached 145° C.±5° C., the elastomeric material was unloaded. Sulphur and the accelerator (TBBS) were added and mixing was carried out in an open roll mixer (2nd step).

Example 8

Preparation of Standard Vulcanisable Elastomeric Materials (1) Comprising Modified sepiolite fibres The sepiolite fibres F1 modified as per Example 1 were incorporated together with conventional silica SIL in standard compositions (1) for vulcanisable elastomeric materials for tyre components. These materials (MD) were compared with comparative elastomeric materials, comprising standard fillers, in particular containing only conventional silica (SIL in MA) or conventional silica along with unmodified sepiolite fibres (F-SE in MB) or conventional silica along with sepiolite fibres treated under drastic acid conditions (F2a, F2b in MC1 and MC2, respectively) as shown in Example 2a and 2b, respectively. Particularly in materials (MB), (MC) and (MD), 10 phr of conventional silica were replaced with 10 phr of unmodified sepiolite or sepiolite modified by drastic treatment or sepiolite modified by bland treatment, respectively.

The elastomeric materials of this example comprise standard compositions (1) suitable for various applications, such as elastomeric under-layer materials (car and heavy vehicles), soft bead (heavy vehicles), sidewall insert (car), or sidewall and are similar to tread formulations (heavy vehicles). Therefore, the results shown by these elastomeric materials are representative of those obtainable with elastomeric materials for tyre components filled with silica or with silica and carbon black in general.

The following Table 3 shows the compositions in phr of the vulcanisable elastomeric materials (MA), (MB), (MC1) and (MD):

TABLE 3

| | Example 8 | | | |
|---|---|---|---|---|
| | | | MC1 | MD |
| | | MB | Ref. | Invention |
| | MA | Ref. | Silica + mod. | Silica + mod. |
| | Ref. | Silica + | sepiolite | sepiolite |
| Filler | Silica | sepiolite | (Ex. 2a) | (Ex. 1) |
| % extracted Mg | — | — | 95% | 33% |
| Zeosil 1115MK | 45 | 35 | 35 | 35 |
| sepiolite | 0 | 10 | 0 | 0 |
| modified sepiolite Ex. 2 | 0 | 0 | 10 | 0 |
| modified sepiolite Ex. 1 | 0 | 0 | 0 | 10 |

TABLE 3-continued

| | Example 8 | | | |
|---|---|---|---|---|
| | | | MC1 | MD |
| | | MB | Ref. | Invention |
| | MA | Ref. | Silica + mod. | Silica + mod. |
| | Ref. | Silica + | sepiolite | sepiolite |
| Filler | Silica | sepiolite | (Ex. 2a) | (Ex. 1) |
| NR | 100 | 100 | 100 | 100 |
| Stearic acid | 2 | 2 | 2 | 2 |
| TESPT silane | 3.6 | 3.6 | 3.6 | 3.6 |
| ZnO | 3.6 | 3.6 | 3.6 | 3.6 |
| 6-PPD | 2 | 2 | 2 | 2 |
| TBBS | 1.8 | 1.8 | 1.8 | 1.8 |
| Sulphur | 2.8 | 2.8 | 2.8 | 2.8 | wherein NR: natural rubber; TESPT: Bis[3-(triethoxysilyl)propyl]tetrasulphide; Zeosil 1115MK: precipitated synthetic amorphous silica (Rhodia); sepiolite: Pangel S9; ZnO: zinc oxide; 6-PPD: N-(1,3-dimethylbutyl)-N'-phenyl-p-phenylenediamine; TBSS: N-tert-butyl-2-benzothiazylsulphenamide.

Example 9

Preparation of Vulcanisable Elastomeric Materials for Internal Applications Comprising Modified Sepiolite Fibres The sepiolite fibres F3, F4, F5, F6 and F7, modified as per Examples 3, 4, 5, 6 and 7, were incorporated together with conventional silica and carbon black in compositions for vulcanisable elastomeric materials for internal components of tyres, such as sidewall insert, bead or under-liner. These materials (MG), (MH), (MI), (MJ) and (MK) were compared with the same elastomeric materials but comprising standard fillers, particularly containing only carbon black and conventional silica (ME), carbon black and conventional silica together with unmodified sepiolite fibres (MF) or carbon black and conventional silica together with sepiolite fibres modified by total extraction of magnesium ions (MC2).

The mixing was conducted in three steps using an internal tangential rotor mixer (Pomini PL 1.6): in the first step, polymers, fillers, and silane were introduced and the mixing was continued for 4-5 minutes, up to reaching 135° C.±5° C., when the composition was unloaded. After 12-24 hours, in the second step, conducted using the same mixer, ZnO, TMQ and 6-PPD were introduced and mixing was continued for about 3 minutes, up to reaching 125° C.±5° C., when the composition was unloaded. After 12-24 hours, in the third step, conducted using the same mixer, TBBS and Sulphur were introduced and mixing was conducted for about 2 minutes, up to reaching 95° C.±5° C., when the composition was unloaded.

The following Table 4 shows the compositions in phr of the vulcanisable elastomeric materials (ME), (MF), (MC2), (MG), (MH), (MI), (MJ) and (MK):

TABLE 4

| | | | Example 9 | | | | | |
|---|---|---|---|---|---|---|---|---|
| Filler | ME Ref. Silica | MF Ref. Silica + sepiolite | MC2 Ref. Silica + mod. sepiolite (Ex. 2b) | MG Inv. Silica + mod. sepiolite (Ex. 3) | MH Inv. Silica + mod. sepiolite (Ex. 4) | MI Inv. Silica + mod. sepiolite (Ex. 5) | MJ Inv. Silica + mod. sepiolite (Ex. 6) | MK inv. Silica + mod. sepiolite (Ex. 7) |
| % ext. Mg | — | — | 97% | 35% | 35% | 26% | 20% | 28% |
| CB N550 | 25 | 25 | 25 | 25 | 25 | 25 | 25 | 25 |
| ZEOSIL 1115 MK | 30 | 20 | 20 | 20 | 20 | 20 | 20 | 20 |
| sepiolite | — | 7 | | — | — | — | — | — |
| Sepiolite mod. ex. 2b | — | — | 7 | — | — | — | — | — |
| sepiolite mod. ex. 3 | — | — | | 8.29 | — | — | — | — |
| sepiolite mod. ex. 4 | — | — | — | — | 9.79 | — | — | — |
| sepiolite mod. ex. 6 | — | — | — | — | — | — | 8.55 | — |
| sepiolite mod. ex. 5 | — | — | — | — | — | 8.55 | — | — |
| sepiolite mod. ex. 7 | — | — | — | — | — | — | — | 8 |
| BR (Nd) | 60 | 60 | 60 | 60 | 60 | 60 | 60 | 60 |
| IR | 40 | 40 | 40 | 40 | 40 | 40 | 40 | 40 |
| Silane | 5 | 5 | 5 | 5 | 5 | 5 | 5 | 5 |
| Stearic acid | 1 | 1 | 1 | 1 | 1 | 1 | 1 | 1 |
| ZnO | 4 | 4 | 4 | 4 | 4 | 4 | 4 | 4 |
| TMQ | 1 | 1 | 1 | 1 | 1 | 1 | 1 | 1 |
| 6-PPD | 1.5 | 1.5 | 1.5 | 1.5 | 1.5 | 1.5 | 1.5 | 1.5 |
| TBBS 80 | 4 | 4 | 4 | 4 | 4 | 4 | 4 | 4 |
| Sulphur | 2.3 | 2.3 | 2.3 | 2.3 | 2.3 | 2.3 | 2.3 | 2.3 | wherein BR(Nd): high-cis neodymium polybutadiene rubber (Europrene 40 Versalis); IR: synthetic polyisoprene (SKI3 produced by Nitzhnekamsk); silane: 50% TESPT: Bis[3-(triethoxysilyl)propyl]tetrasulphide on carbon black; CB: carbon black; Zeosil 1115MK: precipitated synthetic amorphous silica (Rhodia); sepiolite: Pangel S9 (Tolsa); ZnO: zinc oxide; TMQ: polymerised 2,2,4-trimethyl-1,2-dihydroquinoline; 6-PPD: N-(1,3-dimethylbutyl)-N'-phenyl-p-phenylenediamine; TBSS: N-tert-butyl-2-benzothiazyl sulphenamide.

In the material (MF), 10 parts of silica were replaced with 7 parts of sepiolite.

In the material (MC2), 10 parts of silica were replaced with 7 parts of modified sepiolite as described in Example 2b.

In the case of materials (MG), (MH), (MI), (MJ) and (MK), the amount of modified sepiolite to be added, in replacement of 10 phr silica, was calculated taking into account the loss in weight of the samples in TGA, so as to add a quantity of modified fibres corresponding to 7 phr of dry inorganic component, with the aim to obtain mixtures having a comparable hardness.

Example 10

Preparation of Vulcanisable Elastomeric Materials for Tread Applications Comprising Modified Sepiolite Fibres The sepiolite fibres F4 modified as per Example 4 (controlled acid treatment in the presence of silanising agents) were incorporated together with conventional silica in a composition for vulcanisable elastomeric materials for tread. This material (MN) was compared with elastomeric materials comprising standard fillers, in particular containing conventional silica alone (SIL in ML) or conventional silica together with unmodified sepiolite fibres (F-SE in MM).

The mixing was conducted in three steps using an internal tangential rotor mixer (Pomini PL 1.6): in the first step, polymers, fillers, silane, stearic acid and TDAE oil were introduced and the mixing was continued for 4-5 minutes, up to reaching 140° C.±5° C., when the composition was unloaded. After 12-24 hours, in the second step, conducted using the same mixer, ZnO and 6-PPD were introduced and mixing was continued for about 3 minutes, up to reaching 125° C.±5° C., when the composition was unloaded. After 12-24 hours, in the third step, conducted using the same mixer, TBBS, TBZTD and Sulphur were introduced and mixing was continued for about 2 minutes, up to reaching 95° C.±5° C., when the composition was unloaded.

The following Table 5 shows the compositions in phr of the vulcanisable elastomeric materials (ML), (MM) and (MN):

TABLE 5

| | Example 10 | | |
|---|---|---|---|
| Filler | ML Reference Silica | MM Reference Silica + sepiolite | MN Invention Silica + mod. sepiolite (Ex. 4) |
| % ext. Mg | — | — | 35% |
| ZEOSIL 1165 MK | 85 | 75 | 75 |
| sepiolite | — | 7 | — |
| sepiolite mod. ex. 4 (silane) | — | — | 9.79 |
| BR (Nd) | 27 | 27 | 27 |

TABLE 5-continued

| | Example 10 | | |
|---|---|---|---|
| Filler | ML Reference Silica | MM Reference Silica + sepiolite | MN Invention Silica + mod. sepiolite (Ex. 4) |
| S-SBR | 100 | 100 | 100 |
| SI 69 | 6.8 | 6.8 | 6 |
| Stearic acid | 2 | 2 | 2 |
| TDAE oil | 13 | 13 | 13 |
| ZnO | 2.4 | 2.4 | 2.4 |
| 6-PPD | 3.5 | 3.5 | 3.5 |
| TBBS | 2.5 | 2.5 | 2.5 |
| TBZTD | 0.5 | 0.5 | 0.5 |
| Sulphur | 1 | 1 | 1 | wherein BR(Nd): high-cis neodymium polybutadiene rubber (Europrene 40 Versalis); S-SBR: styrene-butadiene rubber SLR 4630 from Styron Europe GmbH; SI 69: Liquid bis[3-(triethoxysilyl)propyl]tetrasulphide (Evonik); Zeosil 1165MK: precipitated synthetic amorphous silica (Rhodia); sepiolite: Pangel S9 (Tolsa); TDAE: distilled aromatic oil; ZnO: zinc oxide; 6-PPD: N-(1,3-dimethylbutyl)-N'-phenyl-p-phenylenediamine; TBSS: N-tert-butyl-2-benzothiazyl sulphenamide; TBZTD: tetrabenzyl thiuram disulphide.

In the material (MM), 10 parts of silica were replaced with 7 parts of sepiolite.

In the case of material (MN), the amount of modified sepiolite to be added, in replacement of 10 phr silica, was calculated taking into account the loss in weight of the samples in TGA, a loss corresponding to the organic portion which in the ramp up to 800° C. was of 28.5%, so as to add a quantity of modified fibres corresponding to 7 phr of dry inorganic component, with the aim to obtain mixtures having a comparable hardness.

Example 11

Preparation of Standard Elastomeric Materials (2) Comprising Modified Sepiolite Fibres The sepiolite fibres F5 modified as per Example 5 (controlled acid treatment in the presence of silanising agents) (36.4 phr) were incorporated as a single filler in a standard composition (2) for vulcanisable elastomeric materials. This material (MP) was compared with elastomeric materials comprising unmodified sepiolite fibres (MO).

The following Table 6 shows the compositions in phr of the vulcanisable elastomeric materials (MO) and (MP):

TABLE 6

| | Example 11 | |
|---|---|---|
| Filler | MO Reference sepiolite | MP Invention modified sepiolite (Ex. 5) |
| % ext. Mg | — | 26% |
| sepiolite Pangel S9 | 35 | — |
| sepiolite mod. ex. 5 | — | 36.4 |
| S-SBR | 100 | 100 |
| TESPD | 2.8 | — |
| Stearic acid | 0.85 | 0.85 |
| ZnO | 2.7 | 2.7 |
| 6-PPD | 1 | 1 |
| Sulphur | 2 | 2 |
| CBS | 1.5 | 1.5 | wherein S-SBR: styrene-butadiene rubber SLR 4630 from Styron Europe GmbH; TESPD: Bis(3-triethoxysilylpropyl) disulphide from Aldrich; 6-PPD: N-(1,3-dimethylbutyl)-N'-phenyl-p-phenylenediamine Santoflex-6 PPD from Flexsys; stearic acid: Stearin TP8 from Undesa; Sulphur: S8 (soluble sulphur) from Zolfo Industria; ZnO: zinc oxide from Zincol Ossidi; CBS: N-cyclohexyl-2-benzothiazyl sulphenamide Vulkacit CZ/C from Lanxess.

Figure 8A:
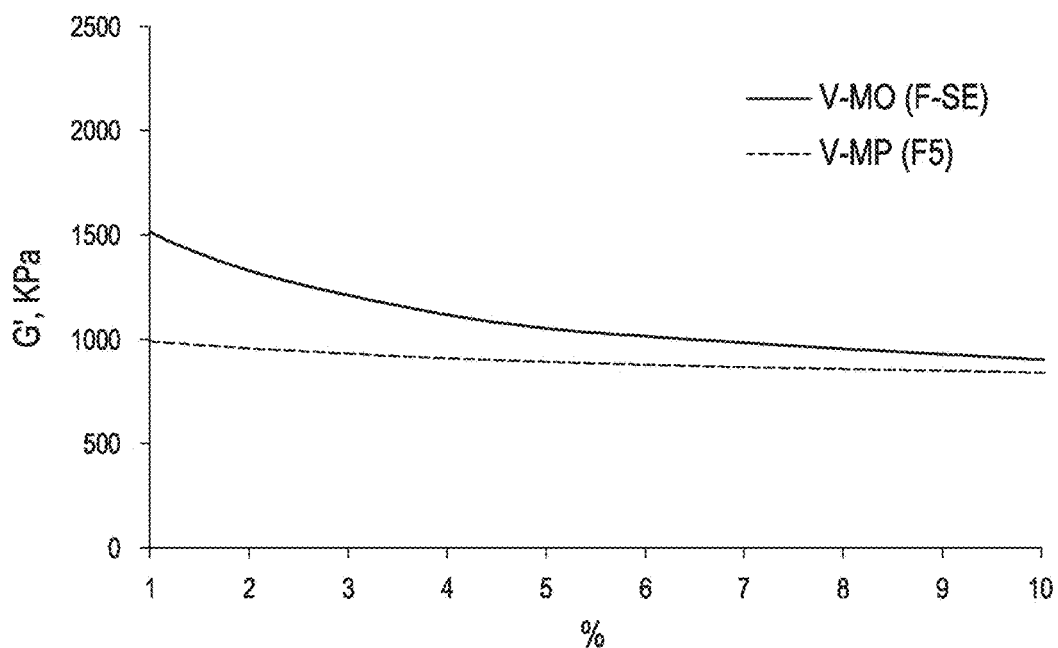
FIGS. 8 (A and B) shows the pattern of the dynamic elastic modulus and of the tan delta at increasing strain of samples of elastomeric materials comprising unmodified sepiolite fibres F-SE (V-MO) and sepiolite fibres F5 modified as per Example 5 (V-MP).

FIG. 8A shows the pattern of module G' for these materials (see Example 15 for a detailed review).

Preparation and Characterisation of the Vulcanised Elastomeric Materials

The elastomeric materials prepared in the previous examples were vulcanised to give specimens on which analytical characterisations and the assessment of static and dynamic mechanical properties were conducted.

Unless otherwise indicated, vulcanisation was carried out in a mould, in hydraulic press at 170° C. and at a pressure of 200 bar for about 10 minutes.

In the present description, the vulcanised samples are named with the same initials of the starting green elastomeric material preceded by letter V (for example, the vulcanised material named V-MK derives from material MK).

The static mechanical properties were measured according to the ISO 37:2005 standard at different elongation (50%, 100%, 300%) on samples of the elastomeric materials vulcanised at 170° C. for 10 minutes. The tensile tests were carried out on Dumbell specimens.

The dynamic mechanical properties were evaluated using a Monsanto R.P.A. 2000 according to the following method: cylindrical test specimens with weights in the range of 4.5 to 5.5 g were obtained by punching the vulcanisable elastomeric composition of the samples and their vulcanisation in the instrument "RPA" (at 170° C. for 10 minutes). The vulcanised samples were subjected to dynamic measurement of the elastic shear modulus (G') at 70° C., 10 Hz frequency, 0.1% and 10% strain.

The Payne effect was evaluated by the difference between the shear modules (G') at 10% and 0.5%, unless otherwise indicated.

Moreover, the dynamic compression modules were measured using an Instron dynamic device in the compression mode according to the following methods. A test piece of cross-linked material having a cylindrical shape (length=25 mm; diameter=14 mm), preloaded in compression up to a longitudinal strain of 25% with respect to the initial length and maintained at the predetermined temperature (23° C. or 70° C.) for the whole duration of the test was subjected to a dynamic sinusoidal strain having an amplitude of ±3.5% with respect to the length under pre-load, with a frequency of 100 Hz.

The dynamic mechanical properties are expressed in terms of dynamic elastic modulus (E') and Tan delta (loss factor).

The Tan delta value was calculated as the ratio between the viscous dynamic module (E") and the dynamic elastic modulus (E'), both being determined by the above dynamic measurements.

The heat generation and flexing fatigue during compression were measured using a Goodrich flexometer according to ASTM D 623-07. The test consisted in subjecting a rubber sample of defined size and shape to compressive stresses by rapid oscillation under controlled conditions. The increase in temperature was also measured. In particular, the increase in temperature was measured up to an equilibrium temperature.

In this test method, a defined compressive load is applied on a test sample through a linkage system having high inertia, while imposing an additional high frequency cyclic compression of defined amplitude on the sample. The increase in temperature at the base of the test sample is measured with a thermocouple to provide an indication of the heat generated during the flexing of the sample.

The standard test sample, a cylinder with a diameter of 17.8 mm and a height of 25 mm, was moulded.

The test conditions were: excursion=6.35 mm; load (on beam)=216 N; time=30 minutes; temperature=23° C. The test ended after 30 minutes, when the final internal temperature of the sample was determined.

Example 12 (Standard Vulcanised Elastomeric Materials 1)

The elastomeric materials (MA), (MB), (MC1) and (MD) prepared in Example 8 and vulcanised at 170° C. for 10 minutes were subjected to measurement of the static and dynamic mechanical properties according to the previously described methods, except for the dynamic strain range of 0.4% to 35% in the shear test (G') carried out with the instrument "RPA". The following table 7 shows the values measured for the four samples:

TABLE 7

|  | Example 12 | | | |
| --- | --- | --- | --- | --- |
| Filler | V-MA Reference Silica | V-MB Reference Silica + sepiolite | V-MC1 Reference Silica + mod. sepiolite Ex. 2a | V-MD Invention Silica + mod. sepiolite Ex. 1 |
| % ext. Mg | — | — | 95% | 33% |
| Ca0.1 [MPa] | 0.48 | 0.62 | 0.42 | 0.50 |
| Ca0.5 [MPa] | 1.45 | 2.47 | 1.23 | 1.67 |
| Ca1 [MPa] | 2.91 | 5.63 | 2.48 | 3.79 |
| Ca3 [MPa] | 16.76 | 18.50 | 12.69 | 16.68 |
| CR [MPa] | 21.57 | 23.39 | 22.83 | 21.94 |
| AR [%] | 361.05 | 371.34 | 462.04 | 376.85 |
| G' (0.4%) [Mpa] | 1.51 | 1.48 | 1.21 | 1.31 |
| ΔG'(0.4-35%)/ G' 0.4% | 0.30 | 0.31 | 0.27 | 0.27 |
| Tan delta max | 0.071 | 0.074 | 0.082 | 0.071 |

The analysis of the data in Table 7 shows that by replacing an aliquot of silica in a standard elastomeric material (1) (V-MA) with the same weight of unmodified sepiolite fibres F-IF, an elastomeric material (V-MB) is obtained with higher reinforcement but worsened hysteresis and Payne effect (see tan delta and ΔG' (0.4-35%)/G' (0.4%).

Using sepiolite fibres modified by drastic acid treatment F2a (comparative V-MC1, prepared in Example 2a, with 95% magnesium extraction and loss of the needle-shaped morphology and of the crystalline structure), a worsening of both the static properties and, above all, of the hysteresis (higher tan delta) is observed. Conversely, by incorporating modified sepiolite fibres F1 according to the present controlled acid treatment (V-MD) in the elastomeric material, a lower hysteresis than that of the material comprising untreated sepiolite (V-MB) and comparable to that of the material comprising silica alone (V-MA) is observed, but with a significant improvement of the Payne effect and satisfactory static properties.

The result is a very advantageous elastomeric material, with comparable hysteresis but with reduced Payne effect compared to the standard elastomeric material 1 (V-MA).

Moreover, as can be seen from the data in Table 7, the sepiolite fibres treated in drastic acid conditions F2a (as per Example 2a) and incorporated into these reference elastomeric materials (V-MC1) involve a lower static reinforcement than that of commercial silica (V-MA), and a much higher hysteresis (tan delta of 0.082 compared to 0.071): it is particularly surprising that both the unmodified starting sepiolite (V-MB) and the exhaustive reaction product with acid (V-MC1) induce both a higher hysteresis in the materials, while the sepiolite modified by controlled acid treatment causes a hysteresis of the material (V-MD) lower than both reference materials.

Example 13 (Vulcanised Elastomeric Materials for Internal Applications)

The vulcanisable elastomeric materials (ME), (MF), (MC2), (MG), (MH), (MI), (MJ) and (MK) prepared in Example 9 and vulcanised at 170° C. for 10 minutes were subjected to measurement of the static and dynamic mechanical properties according to the methods described above. The following table 8 shows the values measured for the seven samples:

TABLE 8

|  | Example 13 | | | | | | | |
| --- | --- | --- | --- | --- | --- | --- | --- | --- |
| Filler | V-ME Ref. Silica | V-MF Ref. Silica + Sep. | V-MC2 Ref. Silica + mod. sepiolite Ex. 2b | V-MG Inv. Silica + mod. sepiolite Ex. 3 | V-MH Inv. Silica + mod. sepiolite Ex. 4 | V-MI Inv. Silica + mod. sepiolite Ex. 5 | V-MJ Inv. Silica + mod. sepiolite Ex. 6 | V-MK Inv. Silica + mod. sepiolite Ex. 7 |
| % extracted Mg | — | — | 97% | 35% | 35% | 26% | 20% | 28% |
| Ca0.5 [MPa] | 2.34 | 2.48 | 2.00 | 2.51 | 2.47 | 2.28 | 2.60 | 2.60 |
| Ca1 [MPa] | 4.90 | 5.47 | 4.04 | 5.44 | 5.42 | 4.96 | 5.64 | 5.75 |
| CR [MPa] | 11.6 | 14.70 | 11.9 | 12.27 | 12.58 | 13.69 | 12.10 | 14.24 |
| AR [%] | 198.4 | 242.87 | 266.1 | 199.70 | 191.99 | 228.64 | 215.32 | 182.94 |
| IRHD 23° C. | 72.7 | 72.9 | 72.5 | 72.4 | 73.2 | 72.3 | 75.5 | 75.6 |
| IRHD 100° C. | 70.9 | 71.6 | 71.4 | 71.7 | 72.1 | 70.5 | 74.3 | 74.6 |
| E' [MPa] 23° C. 100 Hz | 8.41 | 8.65 | 7.97 | 8.55 | 8.65 | 8.36 | 9.49 | 9.16 |
| E' [MPa] 70° C. 100 Hz | 8.44 | 8.60 | 8.02 | 8.65 | 8.66 | 8.46 | 9.56 | 9.15 |
| Tan Delta 23° C. 100 Hz | 0.094 | 0.101 | 0.097 | 0.075 | 0.074 | 0.093 | 0.082 | 0.084 |

TABLE 8-continued

|  | Example 13 | | | | | | | |
|---|---|---|---|---|---|---|---|---|
| Filler | V-ME Ref. Silica | V-MF Ref. Silica + Sep. | V-MC2 Ref. Silica + mod. sepiolite Ex. 2b | V-MG Inv. Silica + mod. sepiolite Ex. 3 | V-MH Inv. Silica + mod. sepiolite Ex. 4 | V-MI Inv. Silica + mod. sepiolite Ex. 5 | V-MJ Inv. Silica + mod. sepiolite Ex. 6 | V-MK Inv. Silica + mod. sepiolite Ex. 7 |
| Tan Delta 70° C. 100 Hz | 0.066 | 0.070 | 0.066 | 0.052 | 0.050 | 0.065 | 0.056 | 0.058 |
| G' 70° C. (9%) Mpa | 1.69 | 1.59 | 1.63 | 1.64 | 1.64 | 1.57 | 1.74 | 1.75 |
| Tan Delta 70° C. (9%) | 0.101 | 0.112 | 0.095 | 0.095 | 0.092 | 0.097 | 0.102 | 0.098 |
| d_G'(0.5-10) Mpa Goodrich | 1.0 | 1.1 | 0.8 | 0.9 | 0.9 | 0.9 | 1.0 | 0.9 |
| Final internal temp. ° C. | 127.3 | 135.0 | 131.1 | 115.4 | 119.0 | 124.0 | 126.0 | 126.5 |
| Permanent strain | −2.3 | −2.9 | −2.3 | −1.4 | −1.9 | −1.9 | −2.0 | −2.0 |

Mod. sep.: modified sepiolite

The analysis of the data in Table 8 shows that by replacing an aliquot of silica in a conventional elastomeric material (V-ME) with 70% by weight of unmodified sepiolite F-SE, an elastomeric material (V-MF) is obtained, with higher static reinforcement and improved strength, but hysteresis—measured as tan delta at 70° C., both in compression and shear—the Payne effect—measured as the difference of elastic shear modulus at 70° C. between 0.5% and 10% of dynamic strain—and heat generation—measured by the Goodrich test—increase, in addition to the permanent strain measured at the end of the Goodrich test.

By using sepiolite fibres modified by drastic acid treatment F2b (comparative V-MC2, prepared in Example 2b, with 97% magnesium extraction, loss of the crystalline structure and preservation of the needle-shaped morphology), a worsening of the static mechanical properties measured by parameters Ca0.5, Ca1 and CR and of the dynamic ones measured by parameter E' is observed, both with respect to both reference elastomeric materials V-ME and V-MF and with respect to all samples of elastomeric materials according to the invention. Such a worsening is an indication of a deteriorated reinforcement capacity of these fibres modified by drastic acid treatment.

Moreover, the Goodrich test shows a final internal temperature higher than both that of the sample containing silica (V-ME) and of all samples according to the invention (Ex. 3 to 7), indicating that, disadvantageously, the material V-MC2 in use develops more heat.

Finally, the permanent strain of sample V-MC2 is higher compared to the samples according to the invention.

Conversely, by incorporating in the elastomeric material, in replacement of an aliquot of silica, the sepiolite fibres modified according to the present controlled acid treatment, with 35% of magnesium removal, in the absence (F3 in V-MG) or in the presence of sulphur silanising agents (F4 in V-MH), substantially the same static and dynamic reinforcement capacity of the unmodified sepiolite is preserved, the thermoplasticity measured as delta hardness is further enhanced but above all, the dissipative properties, measured as Tan Delta both in the compressive and in the shear test improve drastically.

Surprisingly, the tan delta at 70° C. is lower than 25% in the compression test in the case of samples according to the invention V-MG and V-MH, due to the improved hysteresis imparted by the modified sepiolite fibres F3 and F4. This result is even more significant if we consider that the composition was modified by less than 6% by weight. To further investigate the dissipative behaviour of the materials, flexometry measures were conducted according to Goodrich. This characterisation technique is particularly significant to evaluate compounds with different hysteresis properties. The test is conducted according to ASTM D 623-07 under conditions similar to the dynamic compression tests, but prolonging the test for 30 minutes, imposing a fixed preload and dynamic strain, with the further possibility of measuring the temperature of the samples at the end of the test. This gives an indication of the heat dissipated by the test material during the compression strain, which is directly related to the hysteretic behaviour and its modulus: the higher the modulus and hysteresis, the higher the final temperature.

Table 8 shows the final temperature values: it can be seen that the reference samples with sepiolite V-MF and V-MC2 are heated about 8° C. and 4° C., respectively, more than the reference sample V-ME, while sample V-MH according to the invention is heated 8° C. less than the reference V-ME and therefore 16° C. and 12° C., respectively, less than the corresponding V-MF and V-MC2 with the same dynamic module. In the case of V-MG, the temperature difference is even 20° C. compared to V-MF and 16° C. compared to V-MC2.

In the samples according to the invention, there is also a significant improvement of the permanent strain measured at the end of the Goodrich test, compared to all reference samples.

The sample (V-MJ) comprising fibres in which the removal of magnesium, with a rapid procedure in water, was 20% (F6), showed excellent static and dynamic reinforcement properties, even higher than those of the sample with unmodified sepiolite, keeping a reduced hysteresis both compared to the elastomeric material V-MF and compared to the elastomeric material with silica V-ME. Also the behaviour at the Goodrich tests confirms a better dynamic behaviour, leading to a lower final temperature than the references, despite the very high level of reinforcement. Considerations similar to those for sample V-MJ can be made for sample V-MK, comprising fibres in which the removal of magnesium, with a procedure in alcohol with a non-sulphur silanising agent, was 28%.

The sample containing fibres in which the removal of magnesium was 26% (F5 in V-MI), through a process in isopropanol-water, with little acid, in the presence of TESPT and long times, showed excellent strength, improved compared to the reference without sepiolite V-ME, keeping similar properties of static and dynamic reinforcement with reduced hysteresis and Payne effect, as shown also by the behaviour at the Goodrich test, which leads to a lower final temperature compared to the references, as well as to a lower permanent strain measured at the end of the Goodrich test.

Figure 9:
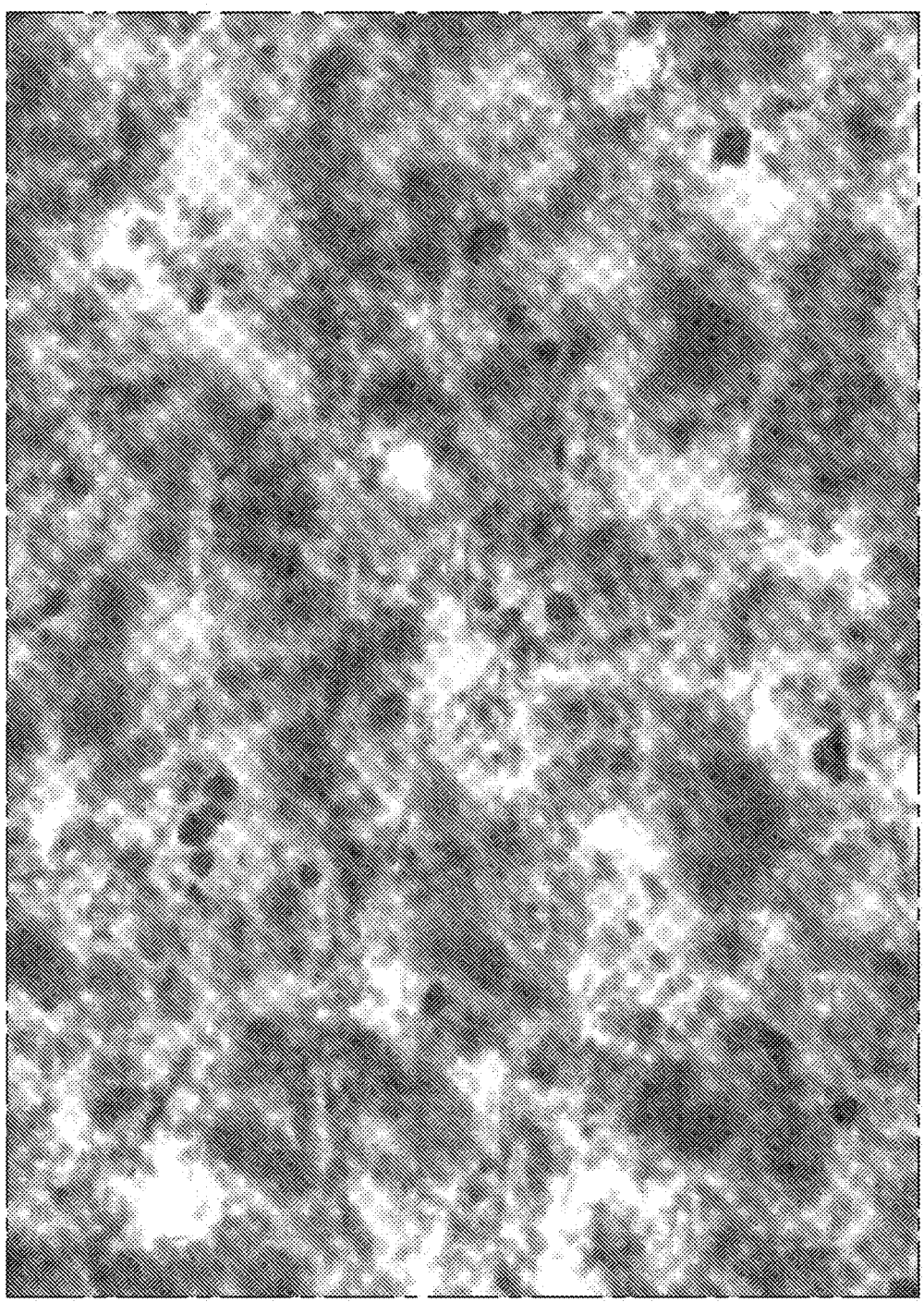
FIG. 9 is an STEM (Scanning Transmission Electron Microscopy) image of a thin section of a vulcanised elastomeric composition (V-MJ Example 13) comprising the sepiolite fibres F6 modified according to Example 6.
Figure 10:
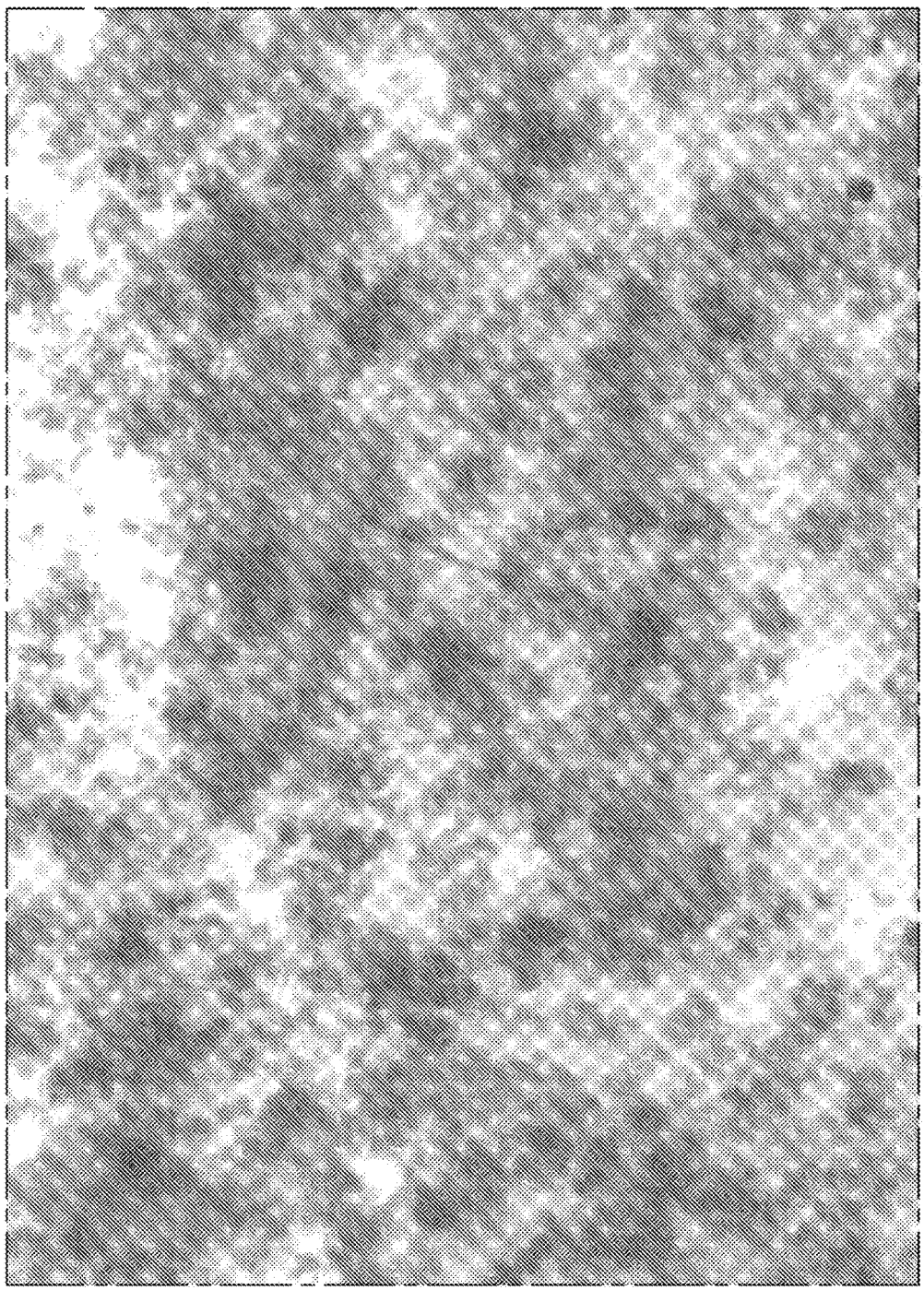
FIG. 10 is an STEM image of a thin section of a vulcanised elastomeric composition (V-MI Example 13) comprising the sepiolite fibres F5 modified according to Example 5.

Sample V-MJ and V-MI were observed at 100000 magnification microscope (STEM Scanning Transmission Electron Microscopy-characterization—on thin sections (50 nm) subjected to cold ultramicrotomy −120° C.). As can be seen in the images in FIGS. 9 and 10, the modified sepiolite fibres incorporated into the elastomeric matrix are clearly visible and it is clear that they have an aspect ratio well above three.

Example 14 (Elastomeric Materials for Tread Applications)

The vulcanisable elastomeric materials (ML), (MM) and (MN) prepared in Example 10 and vulcanised at 170° C. for 10 minutes were subjected to measurement of the static and dynamic mechanical properties according to the methods described above.

The following table 9 shows the values measured for the three samples:

TABLE 9

| Filler | Example 14 | | |
|---|---|---|---|
| | V-ML Reference Silica | V-MM Reference Silica + sepiolite | V-MN Invention Silica + mod. sepiolite Ex. 4 |
| % ext. Mg | — | — | 35% |
| CA 0.5 [MPa] | 1.49 | 1.50 | 1.46 |
| CA 1 [MPa] | 2.46 | 2.69 | 2.62 |
| CA 3 [MPa] | 9.88 | 9.88 | 10.64 |
| CR [MPa] | 14.68 | 15.24 | 15.32 |
| AR % | 436.1 | 463.9 | 441.2 |
| IRHD | 77.6 | 74.9 | 72.7 |
| IRHD 100° C. | 70.8 | 69.5 | 68.2 |
| delta IRHD | 6.8 | 5.4 | 4.5 |
| E' [MPa] 0° C. 100 Hz | 15.11 | 14.39 | 13.95 |
| E' [MPa] 23° C. 100 Hz | 10.57 | 9.88 | 9.72 |
| E' [MPa] 100 Hz | 7.70 | 7.30 | 7.17 |
| Tan Delta 0° C. 100 Hz | 0.501 | 0.519 | 0.504 |
| Tan Delta 100 Hz | 0.296 | 0.298 | 0.281 |
| Tan Delta 100 Hz | 0.152 | 0.145 | 0.141 |
| d_G'(0.5-10) MPa | 2.7 | 2.2 | 1.9 |

The analysis of the data in Table 9 shows that by incorporating sepiolite fibres modified according to the present controlled acid treatment (V-MN) in the elastomeric material, in even smaller amounts than the silica removed (10 phr silica were replaced with 9.79 phr of fibres modified as per Example 9, equal to 7 phr of inorganic residue at 800° C.), a reinforcement capacity is observed that is comparable to or even greater than that of unmodified silica and sepiolite and good strength properties. With the elastomeric material of the invention (V-MN), there is also a better thermoplasticity (delta IRHD), but above all, the dissipative properties, measured as Tan Delta at 70° C. improve drastically. Also the Payne effect is strongly improved.

Example 15 (Standard Elastomeric Materials 2)

The reference elastomeric materials (MO) comprising unmodified sepiolite fibres F-SE and according to the invention (MP) comprising sepiolite fibres F5 from which 26% magnesium was extracted, prepared in Example 11 and vulcanised at 170° C. for 10 minutes, were subjected to measurement of the dynamic mechanical properties using the methods described above.

The dynamic mechanical analysis RPA allowed evaluating the reinforcing effect imparted by the unmodified sepiolite fibres (sample V-MO) and modified according to the invention (sample V-MP) on the vulcanised materials as shown in FIG. 8. FIG. 8A shows how the change in module G' upon varying the strain of the sample according to the invention V-MP is very low compared to that of the reference sample V-MO, indicating greater stability of the material with respect to the strain and therefore a reduced Payne effect.

Figure 8B:
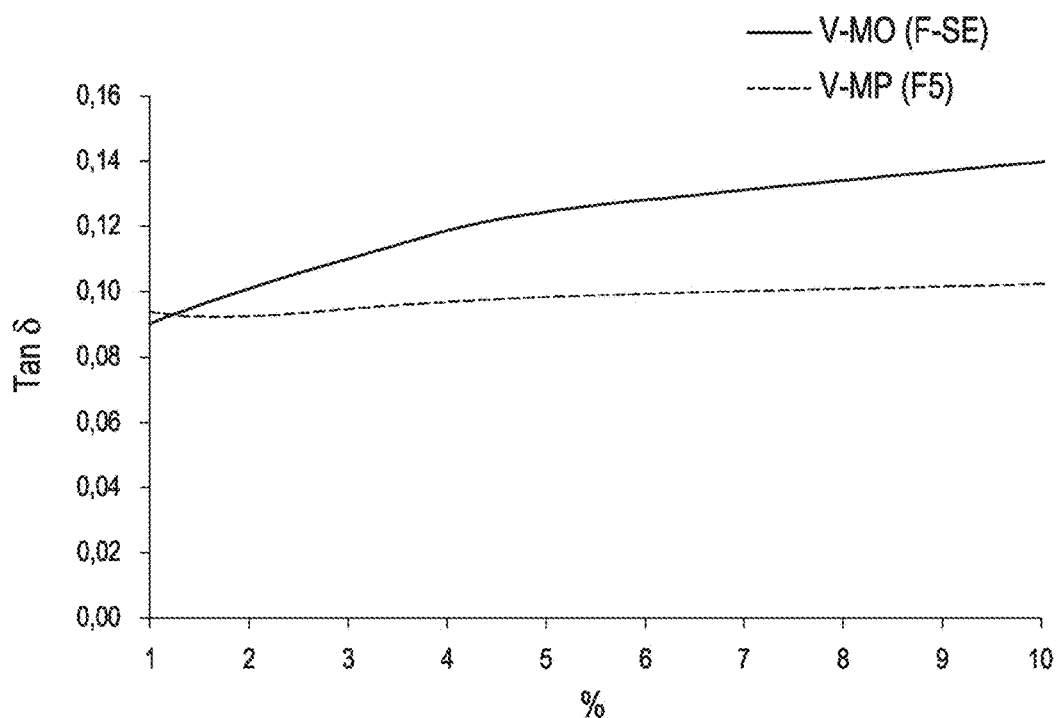

FIG. 8B shows the hysteresis pattern for the two materials: as can be seen, the sample according to the invention has significantly lower and more constant tan delta values than those of the reference sample comprising unmodified sepiolite fibres. The data is particularly significant considering that no coupling agents was added in the mixing step to the sample according to the invention.

In conclusion, from the mechanical analysis conducted on the samples of elastomeric materials according to the invention and reference, it is clear that the presence of fibres modified according to the controlled acid treatment described herein clearly reduces the hysteresis of the elastomeric materials while maintaining a good reinforcement.

These mechanical properties make the elastomeric materials according to the invention particularly suitable for the production of tyres with a high reinforcement and simultaneously reduced rolling resistance.

The invention claimed is:

1. Vulcanisable elastomeric composition for components of tyres comprising at least:
    (a) 100 phr of at least one diene elastomeric polymer,
    (b) from 1 to 80 phr of acid-modified silicate fibres obtained according to a process comprising:
        providing silicate fibres with needle-shaped morphology of nanometric size comprising magnesium ions,
        suspending said fibres in a liquid medium,
        adding at least one acid compound to the suspension,
        allowing the reaction, up to extracting from 10% to 70% by weight of magnesium ions from the fibres with respect to the total weight of magnesium originally contained in the fibres, substantially preserving their crystalline structure and needle-shaped morphology, and
    separating the fibres thus acid-modified from the liquid medium,
    the acid-modified fibres having nanometric size with substantially preserved needle-shaped morphology, and comprising after modification from 3.8% to 12% by weight of magnesium with respect to the weight of the fibres themselves (measured via X-ray fluorescence—XRF);
    (c) from 0 to 120 phr of a standard reinforcement filler;
    (d) from 0.1 to 15 phr of a vulcanising agent, and
    (e) from 0 to 20 phr of a coupling agent.

2. Composition as claimed in claim 1 wherein said acid-modified silicate fibres with substantially preserved needle-shaped morphology of nanometric size originally comprise from 12.5% to 15.5% of magnesium with respect to the weight of the fibres themselves.

3. The composition as claimed in claim 1 wherein said acid-modified silicate fibres with substantially preserved needle-shaped morphology of nanometric size have an aspect ratio of at least 2:1.

4. The composition as claimed in claim 1 wherein said acid-modified silicate fibres with needle-shaped morphology of nanometric size have an aspect ratio of at least 3:1.

5. The composition as claimed in claim 1 wherein said acid-modified silicate fibres with needle-shaped morphology of nanometric size have an aspect ratio of at least 5:1.

6. The composition as claimed in claim 1 wherein said acid-modified silicate fibres with needle-shaped morphology of nanometric size have an aspect ratio of at least 8:1.

7. The composition as claimed in claim 1 wherein said acid-modified silicate fibres with needle-shaped morphology of nanometric size have an aspect ratio of at least 10:1.

8. The composition as claimed in claim 1, wherein said acid-modified silicate fibres with needle-shaped morphology of nanometric size have an aspect ratio not greater than 100:1.

9. The composition as claimed in claim 1 wherein said acid-modified silicate fibres with substantially preserved needle-shaped morphology of nanometric size comprising magnesium are sepiolite fibres.

10. The composition as claimed in claim 1 comprising said acid-modified silicate fibres with needle-shaped morphology of nanometric size (b) in a quantity from 1 phr to 60 phr.

11. The composition as claimed in claim 1 comprising a standard reinforcement filler (c), selected from among carbon black, precipitated amorphous silica, amorphous silica of natural origin, non-modified silicate fibres and mixtures thereof.

12. The composition as claimed in claim 11 comprising said standard reinforcement filler (c) in a quantity comprised between 1 phr and 120 phr.

13. The composition as claimed in claim 11 comprising said standard reinforcement filler (c) in a quantity comprised between between 20 phr and 90 phr.

14. The composition as claimed in claim 11 wherein the overall quantity of acid-modified fibres (b) and standard filler (c) is comprised between 20 phr and 120 phr.

15. The composition as claimed in claim 11 wherein the overall quantity of acid-modified fibres (b) and standard filler (c) is comprised between 30 phr and 90 phr.

16. The composition as claimed in claim 1 wherein said acid-modified silicate fibres with needle-shaped morphology of nanometric size comprise from 9.5% to 12% by weight of magnesium with respect to the weight of the fibres themselves.

17. The composition as claimed in claim 1 comprising said acid-modified silicate fibres with needle-shaped morphology of nanometric size (b) in a quantity from 3 phr to 40 phr.

18. The composition as claimed in claim 1 comprising said acid-modified silicate fibres with needle-shaped morphology of nanometric size (b) in a quantity from 5 phr to 30 phr.

19. Tyre for vehicle wheels comprising at least one tyre component, wherein the at least one tyre component comprises a vulcanised elastomeric material obtained via vulcanisation of the vulcanisable elastomeric composition as claimed in claim 1.

20. The tyre as claimed in claim 19 for high-performance vehicles.

21. The tyre as claimed in claim 19 comprising at least
one carcass structure comprising at least one carcass layer having opposite lateral edges associated with respective bead structures;
one belt structure applied in radially external position with respect to the carcass structure,
one tread band applied in radially outer position with respect to said belt structure, and possibly at least
one under-layer and/or one anti-abrasive elongated element and/or one sidewall and/or one sidewall insert and/or one mini-sidewall and/or one under-liner and/or one rubber layer and/or one sheet,
wherein the at least one tyre component is selected from the group consisting of said tread band and/or carcass structure and/or belt structure and/or under-layer and/or anti-abrasive elongated element and/or sidewall and/or sidewall insert and/or mini-sidewall and/or under-liner and/or rubber layer and/or bead structure and/or sheet.

22. The tyre as claimed in claim 19, wherein said tyre component is selected from the group consisting of the tread, under-layer, anti-abrasive elongated element, sidewall, sidewall insert, mini-sidewall, under-liner, rubber layers, bead filler and sheet.

23. The tyre as claimed in claim 19, wherein said tyre component is selected from the group consisting of the tread, under-layer and sidewall insert.

24. The tyre as claimed in claim 20, wherein the high-performance vehicles are selected from the group consisting of HP, SUV and UHP.

* * * * *